US012580675B2

(12) United States Patent
Xu et al.

(10) Patent No.: US 12,580,675 B2
(45) Date of Patent: Mar. 17, 2026

(54) COMMUNICATION METHOD AND DEVICE, AND CHIP SYSTEM

(71) Applicant: Huawei Technologies Co., Ltd., Shenzhen (CN)

(72) Inventors: Li Xu, Shenzhen (CN); Qiwen Zhong, Shenzhen (CN); Rixin Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 302 days.

(21) Appl. No.: 18/447,573

(22) Filed: Aug. 10, 2023

(65) Prior Publication Data

US 2023/0396353 A1     Dec. 7, 2023

Related U.S. Application Data

(63) Continuation of application No. PCT/CN2021/131942, filed on Nov. 19, 2021.

(30) Foreign Application Priority Data

Feb. 10, 2021    (CN) .......................... 202110185112.9

(51) Int. Cl.
*H04L 1/00*          (2006.01)

(52) U.S. Cl.
CPC .......... *H04L 1/0002* (2013.01); *H04L 1/0057* (2013.01)

(58) Field of Classification Search
CPC ..... H04L 49/90; H04L 1/0057; H04L 1/0072; H04L 69/324; H04L 49/351; H04L 25/49;
(Continued)

(56) References Cited

U.S. PATENT DOCUMENTS

| | | | |
|---|---|---|---|
| 2017/0005742 A1* | 1/2017 | Gareau | ................. H04J 3/1658 |
| 2020/0007255 A1* | 1/2020 | Gareau | ................. H04J 3/1658 |

(Continued)

FOREIGN PATENT DOCUMENTS

| | | |
|---|---|---|
| EP | 2382726 A2 | 11/2011 |
| EP | 3681081 A1 | 7/2020 |

(Continued)

OTHER PUBLICATIONS

"IEEE Standard for Ethernet, Amendment 4: Physical Layer, Specifications and Management Parameters for 100 Gb/s, 200 Gb/s, and 400 Gb/s Electrical Interfaces Based on 100 Gb/s Signaling," IEEE Computer Society, IEEE Std 802.3ck, Sep. 21, 2022, 316 page.

(Continued)

*Primary Examiner* — Jung Liu
(74) *Attorney, Agent, or Firm* — Conley Rose, P.C.

(57) ABSTRACT

A communication method includes, when a rate adaptation or a frequency offset adjustment is performed on a first block sequence, a quantity of first preset blocks that are added or deleted is one of one or more preset values. In this way, a receive end may determine, based on whether the quantity of first preset blocks in the received first block sequence is a preset value, whether an exception occurs in the first preset block during transmission. Based on this, a false packet can be accepted as a correct packet less frequently, thereby improving a mean time to false packet acceptance (MTTFPA) indicator.

20 Claims, 27 Drawing Sheets

CONT. FROM FIG. 2G    CONT. FROM FIG. 2G    CONT. FROM FIG. 2G    CONT. FROM FIG. 2G    CONT. FROM FIG. 2G

A schematic diagram of a bandwidth between all devices before a bandwidth adjustment A schematic diagram of a bandwidth between all devices after an increase of a bandwidth between the second communication device 102 and the intermediate node 112

A schematic diagram of a bandwidth between all devices after an increase of a bandwidth between every two device in the second communication device 102, the intermediate node 112, and the intermediate node 111

A schematic diagram of a bandwidth between all devices after an increase of a bandwidth between every two device in the second communication device 102, the intermediate node 112, the intermediate node 111, and the intermediate node 110

A schematic diagram of a bandwidth between all devices after an increase of a bandwidth between every two device in the second communication device 102, the intermediate node 112, the intermediate node 111, the intermediate node 110, and the first communication device 101

(58) Field of Classification Search
CPC . H04L 49/20; H04J 3/07; H04J 3/1658; H04J 3/1611; H04J 2203/0085; H04J 2203/0003; H04J 2203/0089; H04Q 11/04; H04Q 2213/13389
See application file for complete search history.

(56) References Cited

U.S. PATENT DOCUMENTS

| | | | |
|---|---|---|---|
| 2020/0252350 A1* | 8/2020 | Gareau | H04L 43/0864 |
| 2020/0287998 A1* | 9/2020 | Gorshe | H04L 1/0057 |
| 2021/0058496 A1* | 2/2021 | Mok | H04L 69/22 |
| 2021/0168058 A1* | 6/2021 | Gareau | H04L 43/0811 |
| 2021/0385310 A1* | 12/2021 | Gorshe | H04L 49/90 |

FOREIGN PATENT DOCUMENTS

| | | | |
|---|---|---|---|
| EP | 3723302 A1 | 10/2020 | |
| WO | 2010086195 A2 | 8/2010 | |

OTHER PUBLICATIONS

"IEEE Standard for Ethernet," IEEE Computer Society, IEEE Std 802.3, Jun. 14, 2018, 5600 pages.
IEEE Computer Society:"IEEE Standard for Ethernet." IEEE 3 Park Avenue New York, NY 10016-5997. IEEE Std 802.3™—2018 (Revision of IEEE Std 802.3-2015), Jun. 14, 2018, total 5600 pages.

* cited by examiner

Service 1 → | Transmit end 121 (Interface of the transmit end) (Multiplex) | → | Receive end 122 (Interface of the receive end) (Demultiplex) | → Service 1
Service 2 →                                                                                                                             → Service 2
...                                                                                                                                     ...
Service m →                                                                                                                            → Service m

TO

FROM

| Input data | Synchronization header | 64-bit block payload | | | | | | | | |
|---|---|---|---|---|---|---|---|---|---|---|
| Bit position \ Data block format | 01 | 2 | | | | | | | | 65 |
| $D_0D_1D_2D_3D_4D_5D_6D_7$ | 01 | $D_0$ | $D_1$ | $D_2$ | $D_3$ | $D_4$ | $D_5$ | $D_6$ | $D_7$ | |
| Control block format | | Block type field | | | | | | | | |
| $C_0C_1C_2C_3C_4C_5C_6C_7$ | 10 | 0x1E | $C_0$ | $C_1$ | $C_2$ | $C_3$ | $C_4$ | $C_5$ | $C_6$ | $C_7$ |
| $S_0D_1D_2D_3D_4D_5D_6D_7$ | 10 | 0x78 | $D_1$ | $D_2$ | $D_3$ | $D_4$ | $D_5$ | $D_6$ | $D_7$ | |
| $O_0D_1D_2D_3Z_4Z_5Z_6Z_7$ | 10 | 0x4B | $D_1$ | $D_2$ | $D_3$ | $O_0$ | $C_4$ | $C_5$ | $C_6$ | $C_7$ |
| $T_0C_1C_2C_3C_4C_5C_6C_7$ | 10 | 0x87 | | $C_1$ | $C_2$ | $C_3$ | $C_4$ | $C_5$ | $C_6$ | $C_7$ |
| $D_0T_1C_2C_3C_4C_5C_6C_7$ | 10 | 0x99 | $D_0$ | | $C_2$ | $C_3$ | $C_4$ | $C_5$ | $C_6$ | $C_7$ |
| $D_0D_1T_2C_3C_4C_5C_6C_7$ | 10 | 0xAA | $D_0$ | $D_1$ | | $C_3$ | $C_4$ | $C_5$ | $C_6$ | $C_7$ |
| $D_0D_1D_2T_3C_4C_5C_6C_7$ | 10 | 0xB4 | $D_0$ | $D_1$ | $D_2$ | | $C_4$ | $C_5$ | $C_6$ | $C_7$ |
| $D_0D_1D_2D_3T_4C_5C_6C_7$ | 10 | 0xCC | $D_0$ | $D_1$ | $D_2$ | $D_3$ | | $C_5$ | $C_6$ | $C_7$ |
| $D_0D_1D_2D_3D_4T_5C_6C_7$ | 10 | 0xD2 | $D_0$ | $D_1$ | $D_2$ | $D_3$ | $D_4$ | | $C_6$ | $C_7$ |
| $D_0D_1D_2D_3D_4D_5T_6C_7$ | 10 | 0xE1 | $D_0$ | $D_1$ | $D_2$ | $D_3$ | $D_4$ | $D_5$ | | $C_7$ |
| $D_0D_1D_2D_3D_4D_5D_6T_7$ | 10 | 0xFF | $D_0$ | $D_1$ | $D_2$ | $D_3$ | $D_4$ | $D_5$ | $D_6$ | |

1023 repetitions (repetitions)

| | | | | | | | | | | | | | | | | |
|---|---|---|---|---|---|---|---|---|---|---|---|---|---|---|---|---|
| Overheads (OH) | 0 | 1 | ⋮ | 19 | 0 | 1 | ⋮ | 19 | 0 | 1 | ⋮ | 19 | 0 | 1 | ⋮ | 19 |
| Overheads (OH) | 0 | 1 | ⋮ | 19 | 0 | 1 | ⋮ | 19 | 0 | 1 | ⋮ | 19 | 0 | 1 | ⋮ | 19 |
| Overheads (OH) | 0 | 1 | ⋮ | 19 | 0 | 1 | ⋮ | 19 | 0 | 1 | ⋮ | 19 | 0 | 1 | ⋮ | 19 |
| Overheads (OH) | 0 | 1 | ⋮ | 19 | 0 | 1 | ⋮ | 19 | 0 | 1 | ⋮ | 19 | 0 | 1 | ⋮ | 19 |
| Overheads (OH) | 0 | 1 | ⋮ | 19 | 0 | 1 | ⋮ | 19 | 0 | 1 | ⋮ | 19 | 0 | 1 | ⋮ | 19 |
| Overheads (OH) | 0 | 1 | ⋮ | 19 | 0 | 1 | ⋮ | 19 | 0 | 1 | ⋮ | 19 | 0 | 1 | ⋮ | 19 |
| Overheads (OH) | 0 | 1 | ⋮ | 19 | 0 | 1 | ⋮ | 19 | 0 | 1 | ⋮ | 19 | 0 | 1 | ⋮ | 19 |
| Overheads (OH) | 0 | 1 | ⋮ | 19 | 0 | 1 | ⋮ | 19 | 0 | 1 | ⋮ | 19 | 0 | 1 | ⋮ | 19 |

FIG. 2E

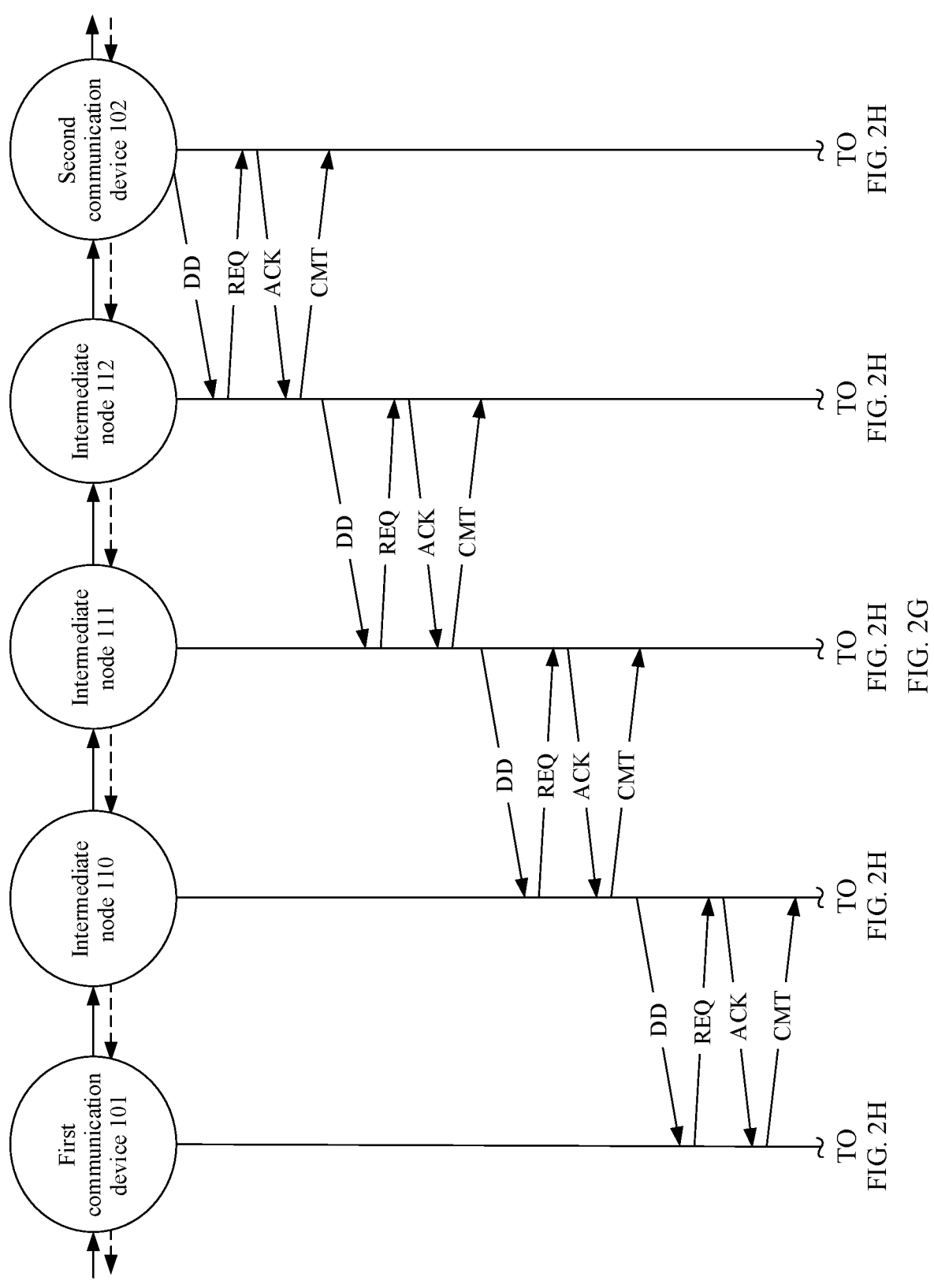

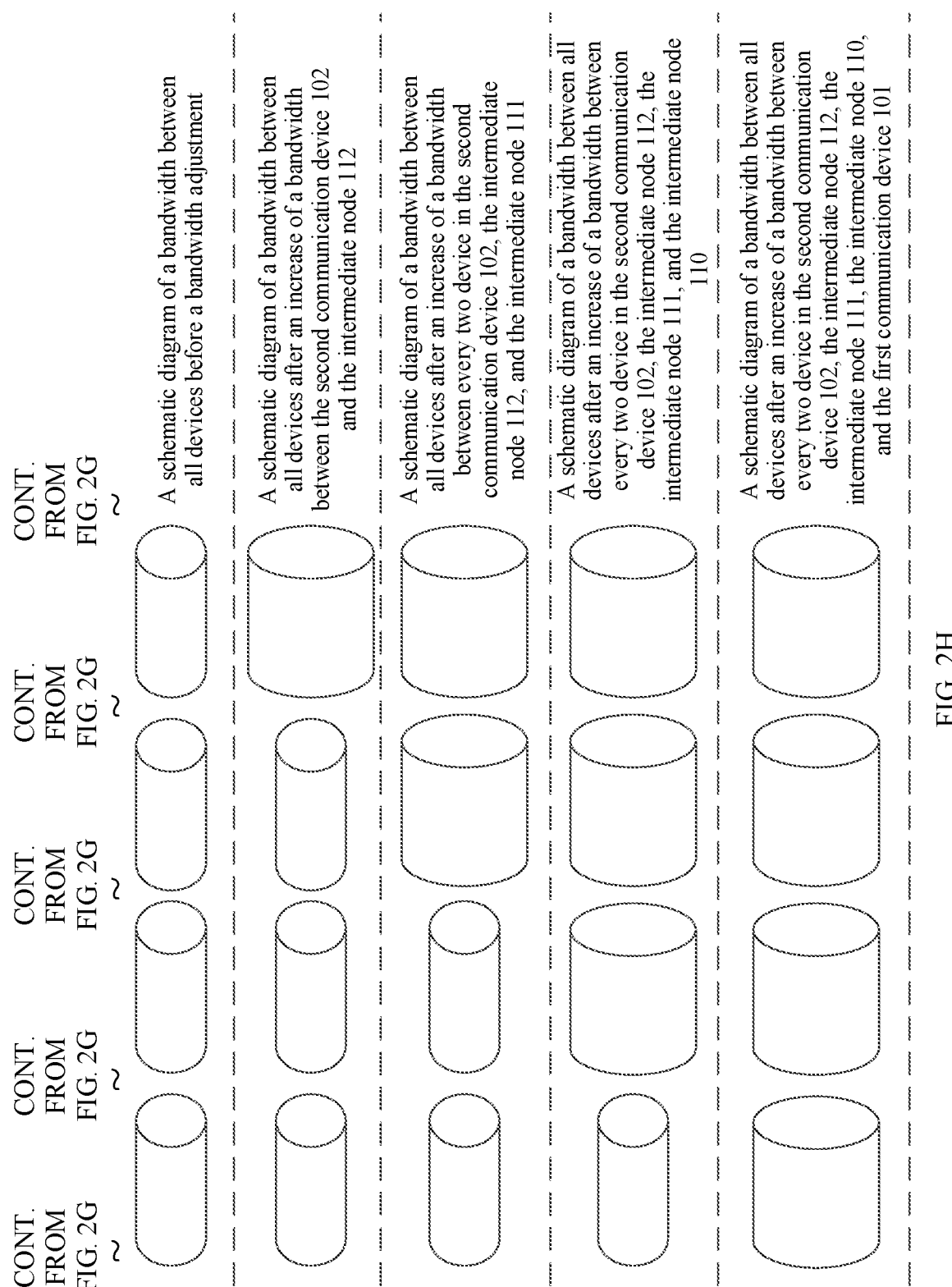

CONT.
FROM
FIG. 2G

CONT.
FROM
FIG. 2G

CONT.
FROM
FIG. 2G

CONT.
FROM
FIG. 2G

CONT.
FROM
FIG. 2G

A schematic diagram of a bandwidth between all devices before a bandwidth adjustment A schematic diagram of a bandwidth between all devices after an increase of a bandwidth between the second communication device 102 and the intermediate node 112

A schematic diagram of a bandwidth between all devices after an increase of a bandwidth between every two device in the second communication device 102, the intermediate node 112, and the intermediate node 111

A schematic diagram of a bandwidth between all devices after an increase of a bandwidth between every two device in the second communication device 102, the intermediate node 112, the intermediate node 111, and the intermediate node 110

A schematic diagram of a bandwidth between all devices after an increase of a bandwidth between every two device in the second communication device 102, the intermediate node 112, the intermediate node 111, the intermediate node 110, and the first communication device 101

FIG. 2H

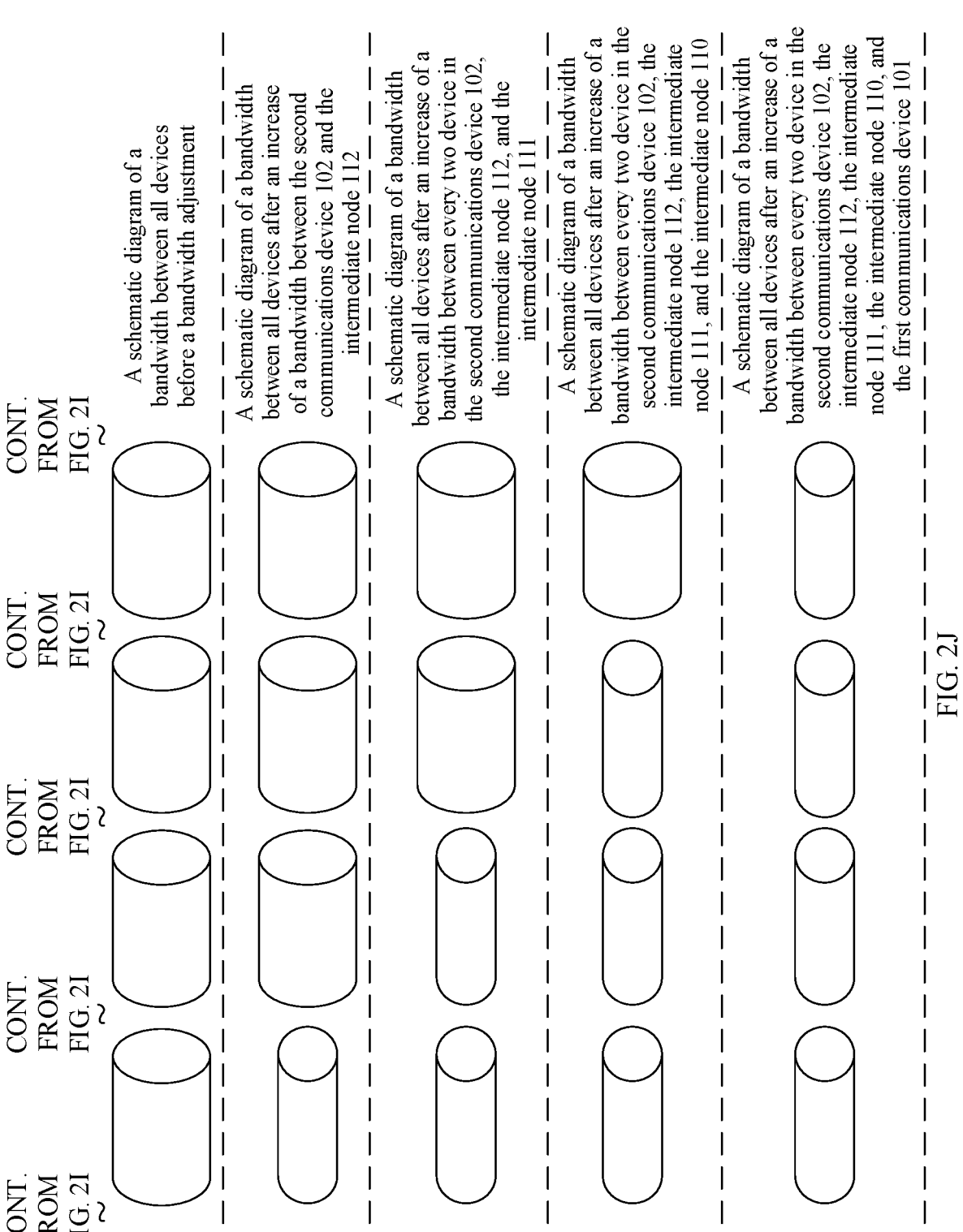

CONT.
FROM
FIG. 2I

CONT.
FROM
FIG. 2I

CONT.
FROM
FIG. 2I

CONT.
FROM
FIG. 2I

CONT.
FROM
FIG. 2I

A schematic diagram of a bandwidth between all devices before a bandwidth adjustment A schematic diagram of a bandwidth between all devices after an increase of a bandwidth between the second communications device 102 and the intermediate node 112

A schematic diagram of a bandwidth between all devices after an increase of a bandwidth between every two device in the second communications device 102, the intermediate node 112, and the intermediate node 111

A schematic diagram of a bandwidth between all devices after an increase of a bandwidth between every two device in the second communications device 102, the intermediate node 112, the intermediate node 111, and the intermediate node 110

A schematic diagram of a bandwidth between all devices after an increase of a bandwidth between every two device in the second communications device 102, the intermediate node 112, the intermediate node 111, the intermediate node 110, and the first communications device 101

FIG. 2J

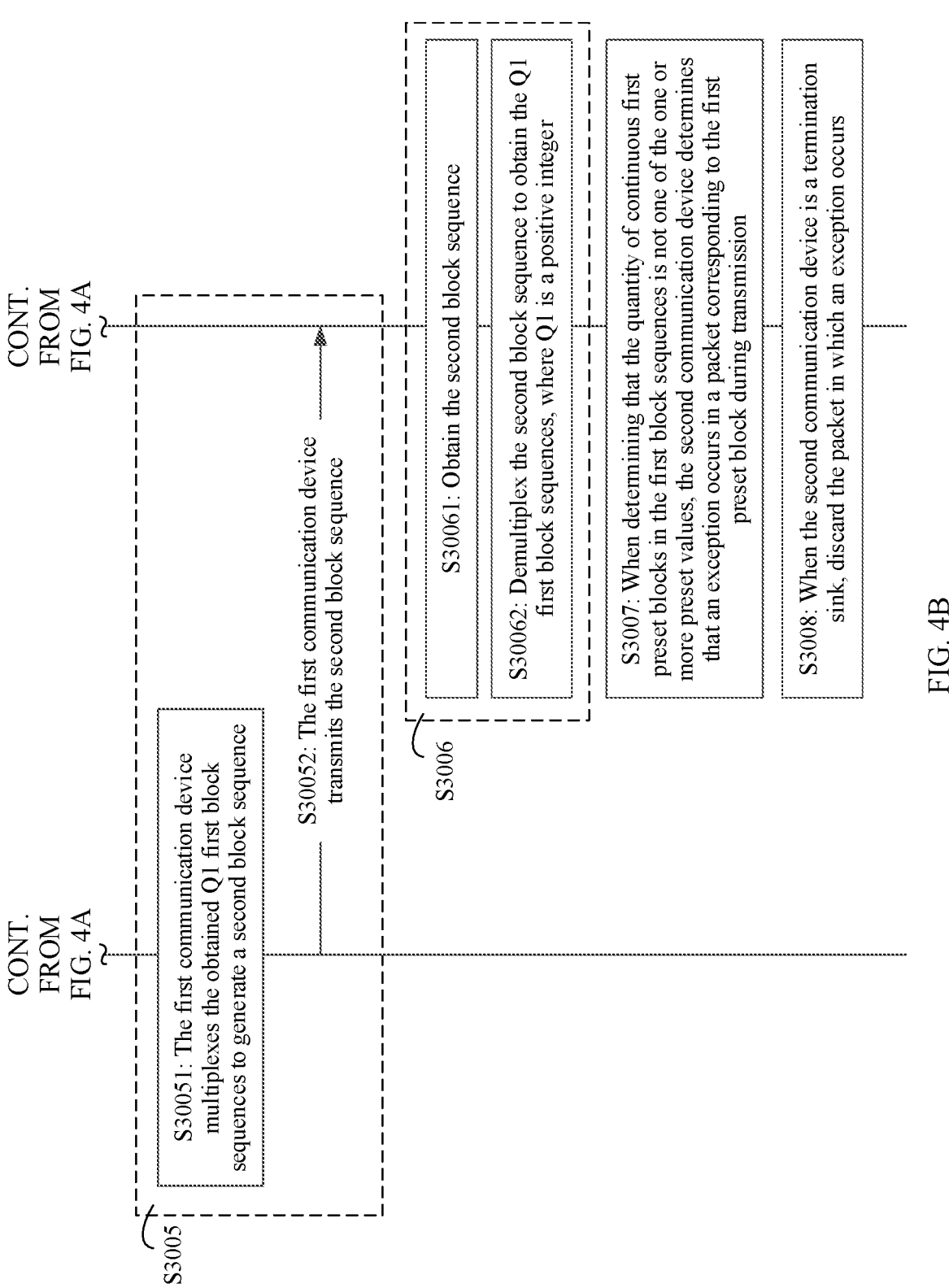

CONT.
FROM
FIG. 4A

CONT.
FROM
FIG. 4A

S3005

S30051: The first communication device multiplexes the obtained Q1 first block sequences to generate a second block sequence S30052: The first communication device transmits the second block sequence

S3006

S30061: Obtain the second block sequence

S30062: Demultiplex the second block sequence to obtain the Q1 first block sequences, where Q1 is a positive integer S3007: When determining that the quantity of continuous first preset blocks in the first block sequences is not one of the one or more preset values, the second communication device determines that an exception occurs in a packet corresponding to the first preset block during transmission S3008: When the second communication device is a termination sink, discard the packet in which an exception occurs

FIG. 4B

COMMUNICATION METHOD AND DEVICE, AND CHIP SYSTEM

CROSS-REFERENCE TO RELATED APPLICATIONS

This is a continuation of International Patent Application No. PCT/CN2021/131942 filed on Nov. 19, 2021, which claims priority to Chinese Patent Application No. 202110185112.9 filed on Feb. 10, 2021. The disclosures of the aforementioned applications are hereby incorporated by reference in their entireties.

TECHNICAL FIELD

This disclosure relates to the communication field, and in particular, to a communication method and device, and a chip system.

BACKGROUND

With advent of a fifth generation (5G) era, various new services (such as a cloud service and internet of vehicles) constantly emerge, posing a new requirement on Ethernet technologies. A plurality of technologies is generated, including a Flexible Ethernet (FlexE) technology, a metro transport network (MTN) technology, an optical transport network (OTN) technology, and a fine granularity optical service unit (OSU) channel layer network of the optical transport network technology.

The FlexE is a lightweight enhanced Ethernet technology. The FlexE supports interface bonding and channelization, and can be used to construct end-to-end links. The flex Ethernet supports a larger bandwidth by bonding interfaces. For example, eight 100 gigabits per second (Gbps) interfaces are bonded to achieve an 800 Gbps bandwidth. The channelization implements flexible bandwidth allocation, supports access of various service rates, and is not subject to the stepped rate system defined in the Institute of Electrical and Electronics Engineers (IEEE) 802.3 standard. In addition, the FlexE divides a 100 Gbps interface into 20 slots, and each slot is 5 Gbps. Therefore, the FlexE may support an N×5 Gbps service in a slot allocation manner. Because a bandwidth allocated by the FlexE needs to use 5 Gbps as a basic unit, the FlexE has a bearing efficiency problem for a service with a non-5 Gbps granularity, including a service less than 5 Gbps.

Based on the FlexE technology, the MTN provides a function such as channel forwarding, and operations, administration, and maintenance (OAM). Same as FlexE, slot allocation corresponding to the FlexE is also at a granularity of 5 Gbps. Therefore, there is also a bearing efficiency problem, especially for a fine granularity service, for example, a service requiring a bandwidth of 10 megabits per second (Mbps) or 100 Mbps.

An Ethernet high quality leased line technology provides a pipe bandwidth with a finer granularity based on the MTN/FlexE technology. Usually, an MTN/FlexE channel with a slot granularity of 5 Gbps is referred to as a coarse granularity pipe. A fine granularity service is carried in the coarse granularity pipe. That is, the fine granularity service occupies one 5 Gbps. A minimum bandwidth of the fine granularity service is 10 Mbps. The 5 Gbps coarse granularity pipe provides 480 fine granularity slots to carry the fine granularity service.

In actual application, a bandwidth requirement of a coarse granularity service or a fine granularity service may change. A solution for bandwidth adjustment is urgently required.

In an application, there are some requirements on adjusting a rate of a service (a coarse granularity service or a fine granularity service), for example, a rate adaptation requirement or a frequency offset adjustment requirement. For example, for a coarse granularity service, when a rate at which a device receives the coarse granularity service is lower than a rate at which the coarse granularity service is transmitted, for rate adaptation, an idle block usually needs to be filled in a block sequence of the service to perform rate adaptation. If a rate at which a device receives the coarse granularity service is higher than a rate at which the coarse granularity service is transmitted, for rate adaptation, an idle block usually needs to be deleted from a block sequence of the service to perform rate adaptation.

No matter what a requirement is, in a process of adjusting the rate of the service, generally, a purpose is achieved by adding or deleting an idle block. However, in a current technology, an error may occur during transmission of the idle block. For example, bit flip (for example, bit flip in a synchronization header of the idle block) may be caused, and consequently, a receive end may identify the idle block as another block (for example, as a data block). In this case, the receive end may not identify an error that has occurred in a block corresponding to a packet during the transmission, and continue to perform subsequent processing on the packet. As a result, the false packet may be processed as a correct packet, and a mean time to false packet acceptance (MTTFPA) indicator does not satisfy the requirement.

SUMMARY

Embodiments of this disclosure provide a communication method and device, and a chip system, so that when there is a rate adaptation and/or frequency offset adjustment requirement, a quantity of first preset blocks that are added to or deleted from a first block sequence is a preset value. In this way, a receive end may determine, based on whether the quantity of first preset blocks in the received first block sequence is a preset value, whether an exception occurs in the first preset block during transmission. Based on this, a false packet can be accepted as a correct packet less frequently, thereby improving an MTTFPA indicator.

According to a first aspect, this disclosure provides a communication method. In the method, a first communication device obtains a first block sequence. A first quantity of continuous first preset blocks is deleted from the first block sequence based on a rate adaptation and/or frequency offset adjustment requirement when a block needs to be deleted from the first block sequence, where the first quantity is an integer greater than 1, and the first quantity is one of one or more preset values. A second quantity of continuous first preset blocks are added to the first block sequence based on the rate adaptation and/or frequency offset adjustment requirement when a block needs to be added to the first block sequence, where the second quantity is an integer greater than 1, and the second quantity is one of the one or more preset values. The first block sequence is transmitted. In this way, a receive end may determine, based on whether the quantity of first preset blocks in the received first block sequence is a preset value, whether an exception occurs in the first preset block during transmission. Based on this, a false packet can be accepted as a correct packet less frequently, thereby improving an MTTFPA indicator.

In a possible implementation, in this embodiment of this disclosure, when the first preset blocks are added to or deleted from the first block sequence, there is no need to pay attention to positions of the added or deleted first preset blocks. Compared with a solution in which an idle block needs to be added to or deleted from an interpacket gap, in this disclosure, as there is no need to pay attention to positions, an interpacket gap does not need to be identified. In other words, a packet does not need to be cached for identifying an interpacket gap, and space for caching a packet can be saved. In addition, as there is no need to cache a packet, a problem of a delay caused by packet caching can also be resolved.

In a possible implementation, a quantity of the first preset blocks in the first block sequence is used to indicate whether an exception occurs in a packet corresponding to the first preset blocks during transmission. In this way, the receive end may determine, based on the quantity of first preset blocks, whether an exception occurs in the packet during transmission.

In a possible implementation, the quantity of first preset blocks in the first block sequence is used to indicate, to a device that receives the first block sequence, whether an exception occurs in the packet corresponding to the first preset blocks during transmission.

In a possible implementation, a relationship between the quantity of first preset blocks in the first block sequence and the preset value is used to indicate whether an exception occurs in the packet corresponding to the first preset blocks during transmission.

In a possible implementation, whether the quantity of first preset blocks in the first block sequence is the preset value is used to indicate whether an exception occurs in the packet corresponding to the first preset blocks during transmission.

In a possible implementation, when the quantity of first preset blocks in the first block sequence is not the preset value, the quantity of first preset blocks in the first block sequence is used to indicate, to the device that receives the first block sequence, that an exception occurs in the packet corresponding to the first preset blocks during transmission. In other words, when the quantity of first preset blocks is not the preset value, the receive end may determine, based on this, that an exception occurs in the packet.

In a possible implementation, whether an exception occurs in the packet during transmission includes whether bit flip occurs in the first preset blocks corresponding to the packet during transmission.

In a possible implementation, the first quantity is equal to or unequal to the second quantity. For example, if the preset value is an even number, the first quantity and the second quantity simply need to be even numbers, and specific values do not need to be agreed on. The specific values may be determined based on the rate adaptation and/or frequency offset adjustment requirement.

To improve flexibility of the solution, in a possible implementation, a preset value in the one or more preset values satisfies one of the following conditions. The preset value is an even number, or the preset value satisfies a preset calculation formula.

To improve flexibility of the solution, in a possible implementation, the first preset blocks are one of the following: idle blocks, local fault blocks, low power blocks, or custom blocks.

In a possible implementation, a coding form of the first preset blocks is 64 bits (B)/65B.

To improve flexibility of the solution, in a possible implementation, the first block sequence includes at least one data unit, and a data unit in the at least one data unit includes a series of continuous blocks.

In a possible implementation, that the first quantity of continuous first preset blocks is deleted from the first block sequence includes the following. The first quantity of continuous first preset blocks is deleted from the blocks included in the data unit in the first block sequence.

In a possible implementation, that the first quantity of continuous first preset blocks is deleted from the first block sequence includes the following. The first quantity of continuous first preset blocks is deleted from blocks included in a gap between two adjacent data units in the first block sequence.

In another possible implementation, when the gap between the two adjacent data units is a preset first gap, the first quantity of continuous first preset blocks is deleted from the blocks included in the gap between the two adjacent data units in the first block sequence. Alternatively, a quantity of the continuous first preset blocks deleted from the blocks included in the first gap between the two adjacent data units in the first block sequence is not the preset value.

In this embodiment of this disclosure, the name "first gap" is defined. First, the first gap is a gap between two adjacent data units, and second, the first gap further needs to satisfy the following. One data unit in the two adjacent data units ends with a termination block, and the other data unit starts with a header block. In this case, a position after the termination block in one data unit and before the header block in the other data unit is referred to as the first gap.

For example, a structural form of a first data unit ends with a termination block, and another block, for example, an I block or an O block, may be further included after the termination block. A second data unit starts with a header block, and may further include another block, for example, an I block or an O block, before the header block.

Some forms of blocks in the first data unit may be the following several types:

. . . DT
. . . TI
. . . TIO
. . . TO

Some forms of blocks in the second data unit may be the following several types:

SD . . .
ISD . . .
OSD . . .
OISD . . .

In the foregoing examples, the S block refers to a header block, the T block refers to a termination block, the I block refers to an idle block, and O refers to an ordered set block.

Based on the foregoing descriptions, in this embodiment of this disclosure, when the first preset blocks are deleted from the first gap, a quantity of the deleted continuous first preset blocks may be the preset value. In still another possible implementation, because a first preset block inserted into the first gap is deleted at the termination sink, at a transmit end, when the first preset blocks are deleted from the first gap, the quantity of deleted first preset blocks may not be limited. In other words, the quantity of deleted first preset blocks may be the preset value or may not be the preset value.

In a possible implementation, that the second quantity of continuous first preset blocks are added to the first block sequence includes the following. The second quantity of continuous first preset blocks are added to the blocks included in the data unit in the first block sequence.

In a possible implementation, that the second quantity of continuous first preset blocks are added to the first block sequence includes the following. The second quantity of continuous first preset blocks are added to blocks included in a gap between two adjacent data units in the first block sequence.

In another possible implementation, when the gap between the two adjacent data units is a preset first gap, the first quantity of continuous first preset blocks is added to the blocks included in the gap between the two adjacent data units in the first block sequence. Alternatively, a quantity of the continuous first preset blocks added to the blocks included in the first gap between the two adjacent data units in the first block sequence is not the preset value.

In this embodiment of this disclosure, the name "first gap" is defined. Related content of the first gap is described above, and details are not described herein again.

Based on the foregoing descriptions, in this embodiment of this disclosure, when the first preset blocks are added in the first gap, the quantity of added continuous first preset blocks may be the preset value. In still another possible implementation, because a first preset block inserted into the first gap is added at the termination sink, at a transmit end, when the first preset blocks are added to the first gap, the quantity of added first preset blocks may not be limited. In other words, the quantity of added first preset blocks may be the preset value or may not be the preset value.

In a possible implementation, the data unit in the at least one data unit satisfies one of the following. The data unit includes a header block and at least one data block, the data unit includes a header block, at least one data block, and a termination block, the data unit includes at least one data block and a termination block, or the data unit includes at least one data block.

In a possible implementation, that the first block sequence is obtained includes: Q1 first block sequences are obtained, where Q1 is a positive integer. That the first block sequence is transmitted includes the following. The Q1 first block sequences are multiplexed to generate a second block sequence, and the second block sequence is transmitted. In this way, the solution of this disclosure may be applied to rate adaptation of a coarse granularity service.

In a possible implementation, that the Q1 first block sequences are multiplexed to generate the second block sequence includes: Q1 first bit streams corresponding to Q1 clients are obtained, where the Q1 clients are in a one-to-one correspondence with the Q1 first bit streams, and the Q1 first bit streams are coded and multiplexed to generate the second block sequence.

In a possible implementation, that the second block sequence is transmitted includes the following. A third block sequence is generated based on the second block sequence, the third block sequence and at least one fourth block sequence are multiplexed to obtain a fifth block sequence, and the fifth block sequence is transmitted. In this way, the solution of this disclosure may be applied to a frequency offset adjustment of a fine granularity service.

In a possible implementation, a coding type of the second block sequence is M1/N1 bit coding, M1 is a positive integer, and N1 is an integer not less than M1, a coding type of the third block sequence is M2/N2 bit coding, M2 is a positive integer, and N2 is an integer not less than M2, one block in the second block sequence includes a synchronization header of (N1−M1) bits and a non-synchronization header of M1 bits, and information carried in a non-synchronization header of one block in the third block sequence includes at least the non-synchronization header of one block in the second block sequence, and the third block sequence further includes indication information used to indicate information carried in the synchronization header of the block in the second block sequence. In a possible implementation, one block in the second block sequence includes a 1-bit synchronization header or a 2-bit synchronization header. In a possible implementation, the indication information, in the third block sequence, used to indicate the information carried in the synchronization header of the block in the second block sequence occupies one bit. In this way, because a second block sequence is compressed, data transmission efficiency can be improved. In addition, after the synchronization header in the second block sequence is compressed from two bits to one bit, the synchronization header in the second block sequence is more likely to flip, causing a problem of MTTFPA. The solutions in this disclosure are applied to this disclosure scenario, so that the MTTFPA is greatly improved.

According to a second aspect, an embodiment of this disclosure provides a communication method. The method includes obtaining a first block sequence, and when a quantity of continuous first preset blocks included in the first block sequence is not one of one or more preset values, determining that an exception occurs in a packet corresponding to the first preset blocks during transmission. In this way, a receive end may determine, based on whether the quantity of first preset blocks in the received first block sequence is a preset value, whether an exception occurs in the first preset block during transmission. Based on this, a second preset block is inserted into a data unit in which an exception occurs, and a data packet can be processed as a false packet, so that a false packet can be accepted as a correct packet less frequently, thereby improving an MTTFPA indicator.

In a possible example, when the receive end counts the first preset blocks, if the quantity of continuous first preset blocks is not the preset value, where for example, the preset value is an even number, but there are one or three first preset blocks, a value obtained by counting the continuous first preset blocks is not an even number, and it indicates that an exception occurs in a packet corresponding to positions of the first preset blocks.

Usually, one packet corresponds to a series of continuous blocks. Therefore, the positions of the first preset blocks may be positions of a series of continuous blocks corresponding to one packet (that is, the first preset blocks inserted by the transmit end into the series of continuous blocks corresponding to one packet). In this case, the packet corresponding to the first preset blocks may be determined.

In another possible case, a gap between two packets further includes another series of continuous blocks, and the first preset blocks included in the gap between the packets may be counted, or may not be counted. When the first preset blocks are counted, if a quantity of the continuous first preset blocks is not the preset value, it is determined that an exception occurs in data corresponding to positions of the first preset blocks during transmission. The data corresponding to the positions of the first preset blocks may be data corresponding to at least one block adjacent to, that is, before or after, the first preset blocks, or may be data corresponding to a block in the gap between the two packets corresponding to the first preset blocks.

In a possible implementation, when the quantity of continuous first preset blocks included in the first block sequence is not one of the one or more preset values, determining that an exception occurs in a packet corresponding to the first preset blocks during transmission includes, for one data unit in the at least one data unit, when the data unit includes the first preset block, and a quantity of first preset blocks included in the data unit is not one of the one or more preset values, determining that an exception occurs in a packet corresponding to the data unit during transmission.

In a possible implementation, for one data unit in the at least one data unit, when the data unit includes the first preset block, and a quantity of first preset blocks included in the data unit is not one of the one or more preset values, at least one second preset block is inserted into the data unit, where the second preset block is used to indicate that an exception occurs in a packet corresponding to the data unit during transmission. The manner of inserting the second preset block to indicate that an exception occurs in the packet is only a possible example. There may be another manner of alarming, for example, an alarm may be given by inserting a marker, generating alarm information, or the like.

To improve flexibility of the solution, in a possible implementation, that the at least one second preset block is inserted into the data unit includes one of the following. At least one first preset block in the data unit is replaced with the second preset block, or the at least one second preset block is added to the data unit.

To improve flexibility of the solution, in a possible implementation, that the at least one first preset block in the data unit is replaced with the second preset block includes at least one of the following: replacing all or a part of first preset blocks in the data unit with the second preset block, deleting a third quantity of first preset blocks from the data unit, and replacing a remaining first preset block in the data unit with the second preset block, where the third quantity is one of the one or more preset values, replacing at least one data block adjacent to the first preset block in the data unit with the second preset block, or replacing a fourth quantity of data blocks adjacent to the first preset block in the data unit with the second preset block, where a sum of the quantity of first preset blocks in the data unit and the fourth quantity is equal to one of the one or more preset values, and the first preset block and the fourth quantity of second preset blocks after the replacement that are in the data unit are a series of continuous blocks.

In a possible implementation, after the at least one second preset block is inserted into the data unit, the method further includes discarding the packet corresponding to the data unit.

To improve flexibility of the solution, in a possible implementation, a preset value in the one or more preset values satisfies one of the following conditions. The preset value is an even number, or the preset value satisfies a preset calculation formula.

To improve flexibility of the solution, in a possible implementation, the first preset blocks are one of the following: idle blocks, local fault blocks, low power blocks, or custom blocks.

In a possible implementation, a coding form of the first preset blocks is 64 bits/65 bits.

In a possible implementation, the second preset block is an error block. In this way, the packet may be discarded.

In a possible implementation, a coding form of the second preset block is 64 bits/65 bits.

To improve flexibility of the solution, in a possible implementation, the data unit in the at least one data unit satisfies at least one of the following. The data unit includes a header block and at least one data block, the data unit includes a header block, at least one data block, and a termination block, the data unit includes at least one data block and a termination block, or the data unit includes at least one data block.

In a possible implementation, the obtaining a first block sequence includes obtaining a second block sequence, and demultiplexing the second block sequence to obtain Q1 first block sequences, where Q1 is a positive integer. In this way, the solution of this disclosure may be applied to rate adaptation of a coarse granularity service.

In a possible implementation, the obtaining a second block sequence includes receiving a fifth block sequence, demultiplexing the fifth block sequence to obtain a third block sequence and at least one fourth block sequence, and obtaining the second block sequence based on the third block sequence, where a bit in the second block sequence is carried in the third block sequence. In this way, the solution of this disclosure may be applied to a frequency offset adjustment of a fine granularity service.

In a possible implementation, a coding type of the second block sequence is M1/N1 bit coding, M1 is a positive integer, and N1 is an integer not less than M1, a coding type of the third block sequence is M2/N2 bit coding, M2 is a positive integer, and N2 is an integer not less than M2, one block in the second block sequence includes a synchronization header of (N1-M1) bits and a non-synchronization header of M1 bits, and information carried in a non-synchronization header of one block in the third block sequence includes at least the non-synchronization header of one block in the second block sequence, and the third block sequence further includes indication information used to indicate information carried in the synchronization header of the block in the second block sequence.

In a possible implementation, one block in the second block sequence includes a 1-bit synchronization header or a 2-bit synchronization header. In a possible implementation, the indication information used to indicate the information carried in the synchronization header of the block in the second block sequence occupies one bit. In this way, because a second block sequence is compressed, data transmission efficiency can be improved. In addition, after the synchronization header in the second block sequence is compressed from two bits to one bit, the synchronization header in the second block sequence is more likely to flip, causing a problem of MTTFPA. The solutions in this disclosure are applied to this disclosure scenario, so that the MTTFPA is greatly improved.

In a possible implementation, for one first block sequence in the Q1 first block sequences, the first block sequence satisfies at least one of the following. No first preset block is included between two adjacent data units in the first block sequence, the first preset block is included between two adjacent data units in the first block sequence, and a quantity of first preset blocks is one of the one or more preset values, or, the first preset block is included between two adjacent data units in the first block sequence, and a quantity of first preset blocks is not one of the one or more preset values.

In a possible implementation, attention is not paid to a quantity of first preset blocks in a gap between data units. In another possible implementation, attention is only paid to a gap that is in gaps between data units and that is not the first gap. For example, when a gap between two adjacent data units is not the first gap, and a quantity of first preset blocks included between the two adjacent data units is not one of the one or more preset values, at least one second preset block is inserted into the gap, and the second preset block is used to indicate that an exception occurs in a block in the gap during transmission.

In still another possible implementation, for the first gap, attention may alternatively be paid to a quantity of first preset blocks in the first gap. For example, when the quantity of first preset blocks included in the first gap is not one of the one or more preset values, at least one second preset block is inserted into the first gap, and the second preset block is used to indicate that an exception occurs in a block in the first gap during transmission.

In correspondence to any one of the communication methods according to the first aspect and the second aspect, this disclosure further provides a communication apparatus. The communication apparatus may be any device at a transmit end (for example, a first communication device) or any device at a receive end (for example, a second communication device) that performs data transmission in a wireless or wired manner, for example, a communication chip or a network device. During communication, a device at a transmit end and a device at a receive end are relative. In some processes of communication, the communication apparatus (for example, the first communication device or the second communication device) may be used as the foregoing network device or the communication chip that can be used in the network device.

According to a third aspect, a communication apparatus is provided, and includes a communication unit and a processing unit, to perform any implementation of any communication method according to the first aspect and the second aspect. The communication unit is configured to perform functions related to transmitting and receiving. Optionally, the communication unit includes a receiving unit and a transmitting unit. In a design, the communication apparatus is the communication chip, and the communication unit may be an input/output circuit or a port of the communication chip.

In another design, the communication unit may be a transmitter and a receiver, or the communication unit may be a transmitter machine and a receiver machine.

Optionally, the communication apparatus further includes modules that may be configured to perform any implementation of any communication method according to the first aspect and the second aspect.

According to a fourth aspect, a communication apparatus is provided. The communication apparatus is the foregoing network device. The communication apparatus includes a processor and a memory. Optionally, the communication apparatus further includes a transceiver. The memory is configured to store a computer program or an instruction. The processor is configured to invoke, from the memory, and run the computer program or the instruction. When the processor executes the computer program or the instruction in the memory, the communication apparatus is enabled to perform any implementation of any communication method according to the first aspect and the second aspect.

Optionally, there are one or more processors, and there are one or more memories.

Optionally, the memory may be integrated with the processor, or the memory and the processor are separately disposed.

Optionally, the transceiver may include a transmitter machine (or transmitter) and a receiver machine (or receiver).

According to a fifth aspect, a communication apparatus is provided, and includes a processor. The processor is coupled to a memory, and may be configured to perform the method according to any one of the first aspect and the second aspect and any possible implementation of the first aspect and the second aspect. Optionally, the communication apparatus further includes the memory. Optionally, the communication apparatus further includes a communication interface, and the processor is coupled to the communication interface.

In another implementation, the communication apparatus is a network device. When the communication apparatus is the network device, the communication interface may be a transceiver or an input/output interface. Optionally, the transceiver may be a transceiver circuit. Optionally, the input/output interface may be an input/output circuit.

In still another implementation, the communication apparatus is a chip or a chip system. When the communication apparatus is the chip or the chip system, the communication interface may be an input/output interface, an interface circuit, an output circuit, an input circuit, a pin, a related circuit, or the like of the chip or the chip system. The processor may alternatively be embodied as a processing circuit or a logic circuit.

According to a sixth aspect, a system is provided. The system includes the foregoing first communication device and second communication device.

According to a seventh aspect, a computer program product is provided. The computer program product includes a computer program (a code or an instruction). When the computer program is run, a computer is enabled to perform the method according to any possible implementation of the first aspect, or the computer is enabled to perform the method according to any implementation of the first aspect and the second aspect.

According to an eighth aspect, a computer-readable storage medium is provided. The computer-readable medium stores a computer program (a code or an instruction). When the computer program is run on a computer, the computer is enabled to perform the method according to any possible implementation of the first aspect, or perform the method according to any implementation of the first aspect and the second aspect.

According to a ninth aspect, a chip system is provided. The chip system may include a processor. The processor is coupled to a memory, and may be configured to perform the method according to any one of the first aspect and the second aspect and any possible implementation of the first aspect and the second aspect. Optionally, the chip system further includes a memory. The memory is configured to store a computer program (a code or an instruction). The processor is configured to invoke, from the memory, and run the computer program, so that a device on which the chip system is installed performs the method according to any one of the first aspect and the second aspect and any possible implementation of the first aspect and the second aspect.

According to a tenth aspect, a processing apparatus is provided, and includes an input circuit, an output circuit, and a processing circuit. The processing circuit is configured to receive a signal by using an input circuit, and transmit a signal by using an output circuit, so that the method according to any one of the first aspect and the second aspect and any possible implementation of the first aspect and the second aspect is implemented.

In a specific implementation process, the processing apparatus may be a chip, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver. A signal output by the output circuit may be output to, for example, but not limited to, a transmitter and transmitted by the transmitter. The input circuit and the output circuit may be a same circuit, and the circuit is used as the input circuit or the output circuit at different moments. A specific implementation of the processor and the circuits is not limited in embodiments of this disclosure.

BRIEF DESCRIPTION OF DRAWINGS

FIG. 2A is a schematic diagram of a structure of a block in a 64B/66B coding format defined in a standard according to an embodiment of this disclosure;

FIG. 2D is a structural form of a low power block according to an embodiment of this disclosure;

FIG. 2E is a schematic diagram of a structure of a frame format in a Flex Ethernet protocol according to an embodiment of this disclosure;

FIG. 2G and FIG. 2H are a schematic diagram of a possible bandwidth increase solution according to an embodiment of this disclosure;

FIG. 2I and FIG. 2J are a schematic diagram of a possible bandwidth reduction solution according to an embodiment of this disclosure;

FIG. 4A and FIG. 4B are a schematic flowchart of another possible communication method according to an embodiment of this disclosure;

DESCRIPTION OF EMBODIMENTS

It should be understood that, technical solutions in embodiments of this disclosure may be applied to various communication systems, for example, communication systems based on an Ethernet technology, for example, for the field of mobile bearer fronthaul or backhaul, a metropolitan area network multi-service bearer, data center interconnection, industrial communication, and the like, and a system for communication between different components or modules in industrial equipment or a telecommunication device.

Figure 1A:
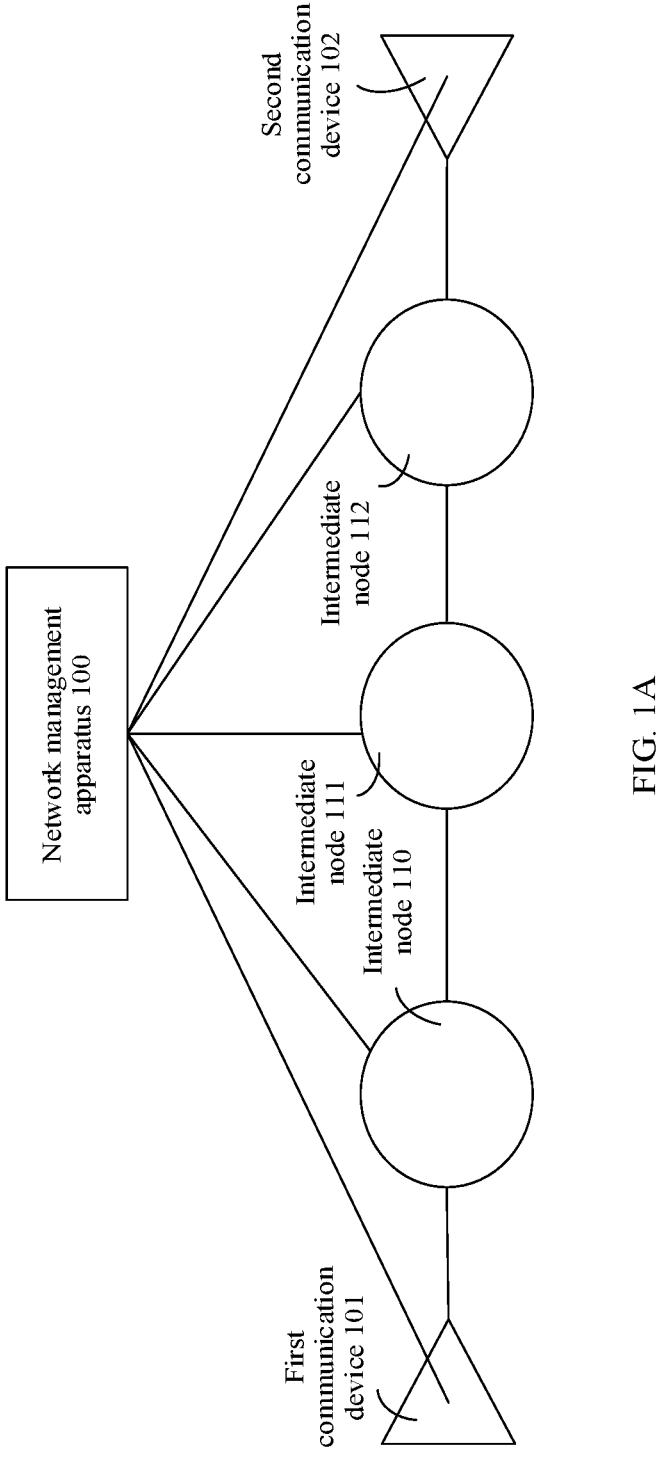
FIG. 1A is a schematic diagram of an application scenario according to an embodiment of this disclosure.

FIG. 1A is a schematic diagram of an example of an application scenario according to an embodiment of this disclosure. The application scenario of embodiments of this disclosure is described below with reference to the accompanying drawings.

As shown in FIG. 1A, a network management apparatus 100, a first communication device 101, a second communication device 102, and several intermediate nodes shown in FIG. 1A, such as an intermediate node 110, an intermediate node 111, and an intermediate node 112, are included. Any device in the network management apparatus 100, the first communication device 101, the second communication device 102, and the intermediate nodes may be a network device, or a chip disposed inside a network device. The device may be a network device that supports a high-speed (for example, 200 gigabits per second (G) or 400 G) Ethernet interface. The device includes, but is not limited to, a core router, an edge router, an OTN transmission device, and an OTN OSU, and a box-type or frame-type switch device for a specific scenario-oriented Internet Protocol (IP) radio access network (RAN) (or IPRAN) or a packet transport network (PTN).

As shown in FIG. 1A, the network management apparatus 100 may be configured to deliver some control or management information to each node, for example, may deliver information about adjusting a bandwidth of a channel (a coarse granularity channel and/or a fine granularity channel mentioned below). The first communication device 101 and the second communication device 102 may transmit data to each other by using the intermediate node.

Any device in the first communication device 101, the intermediate nodes, and the second communication device 102 in FIG. 1A may include a transmitting module and a receiving module. In other words, any device in the first communication device 101, the intermediate nodes, and the second communication device 102 may be used as a transmit end 121 in FIG. 1B, or may be used as a receive end 122 in FIG. 1B in some cases. To be specific, the solution provided in this embodiment of this disclosure that can be applied to the transmit end 121 may be applied to any device in the first communication device 101, the intermediate nodes, and the second communication device 102 in FIG. 1A, and the solution provided in this embodiment of this disclosure that can be applied to the receive end 122 may also be applied to any device in the first communication device 101, the intermediate nodes, and the second communication device 102 in FIG. 1A. To describe embodiments of this disclosure more clearly, an example in which the first communication device 101 in FIG. 1A transmits data to the second communication device 102 by using the intermediate node is used for description below.

Figure 1B:
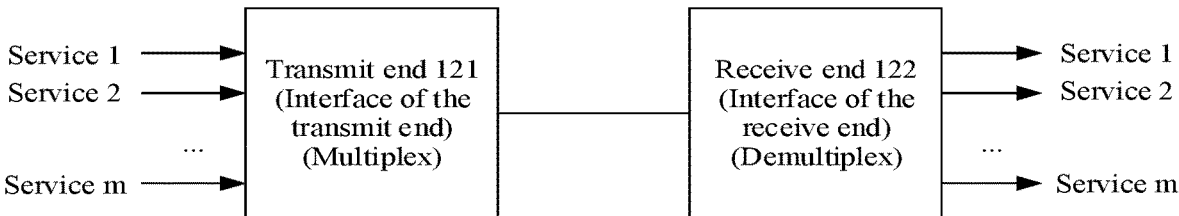
FIG. 1B is a schematic diagram of an architecture for data transmission between two devices in FIG. 1A.

FIG. 1B is a schematic diagram of an example of an architecture for data transmission between two devices in FIG. 1A. As shown in FIG. 1B, the solution in this embodiment of this disclosure may be applied between device interfaces between the transmit end 121 and the receive end 122, for example, applied between a transmit end interface and a receive end interface. In this embodiment of this disclosure, one or more services (for example, a service 1, a service 2, . . . , and a service m in FIG. 1B) may be multiplexed at the transmit end, and multiplexed data is transmitted to the receive end 122. The receive end 122 demultiplexes the data to restore each service. In this embodiment of this disclosure, a service between the transmit end 121 and the receive end 122 may be dynamically adjusted, for example, by adding a service, deleting a service, increasing a service bandwidth, or reducing a service bandwidth. In this embodiment of this disclosure, the transmit end interface and the receive end interface may each be a FlexE interface, an OTN interface, an Ethernet interface, or the like, or a channel obtained by dividing the interface.

Figure 1C:
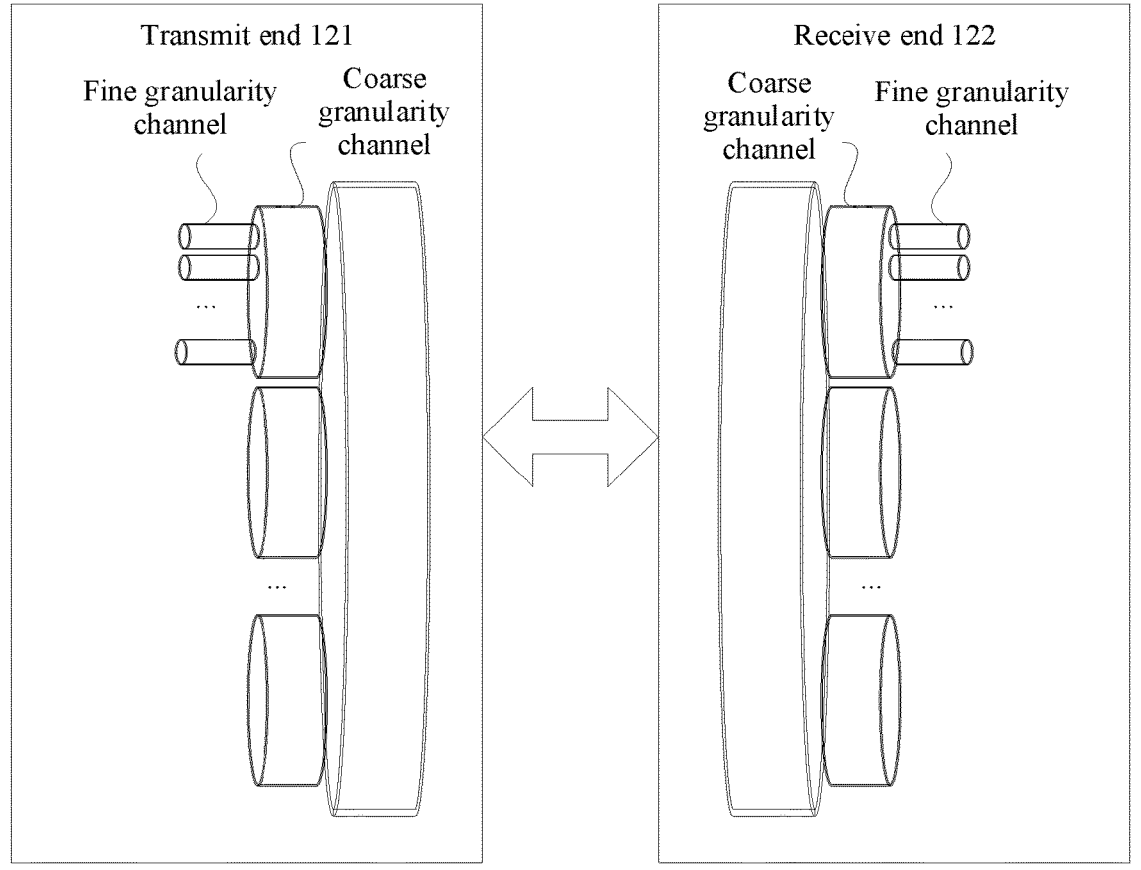
FIG. 1C shows an example of a possible channel division solution based on FIG. 1B.

FIG. 1C shows an example of a possible channel division solution based on FIG. 1B. As shown in FIG. 1C, channels are divided from an interface of the transmit end 121 and an interface of the receive end 122. In embodiments of this disclosure, two nouns, that is, a coarse granularity channel and a fine granularity channel, are defined. The coarse granularity channel and the fine granularity channel are relative to each other. One coarse granularity channel may be divided into at least two fine granularity channels, and a bandwidth of the coarse granularity channel is greater than a bandwidth of the fine granularity channel. In embodiments of this disclosure, in an MTN/FlexE, slots are allocated at a 5 Gbps granularity, and a channel of a 5 Gbps slot granularity in the MTN/FlexE may be referred to as a coarse granularity channel. An Ethernet high quality leased line technology provides a finer granularity channel bandwidth based on the MTN/FlexE technology. A channel of a finer bandwidth granularity provided in the Ethernet high quality leased line technology may be referred to as a fine granularity channel. The fine granularity channel is used to carry one or more fine granularity services.

In this embodiment of this disclosure, the fine granularity service may be relative to a coarse granularity service. The fine granularity service may refer to a service with a bandwidth that is less than a bandwidth of a coarse granularity channel. For example, a service with a bandwidth requirement of 10 Mbps or 100 Mbps may be referred to as a fine granularity service. In this embodiment of this disclosure, a node that needs to multiplex or demultiplex the fine granularity service is referred to as a fine granularity node, and a node that needs to multiplex or demultiplex the coarse granularity service is referred to as a coarse granularity node. A node on a transmission path may be a fine granularity node, or may not be a fine granularity node.

Figures 1D, 1E:
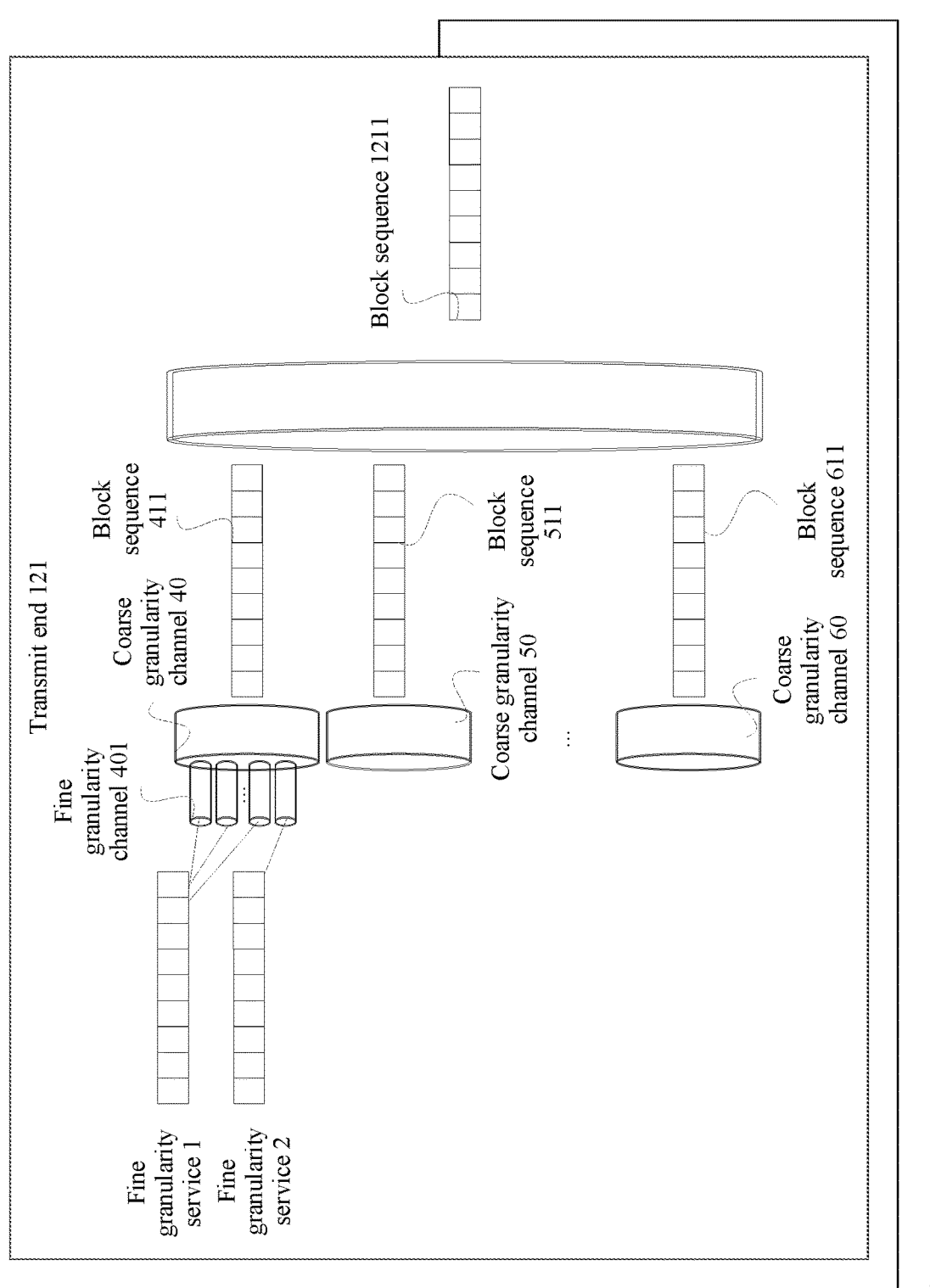
FIG. 1D and FIG. 1E are a schematic diagram of an example of a possible data transmission procedure based on FIG. 1C.
Figures 1D, 1E:
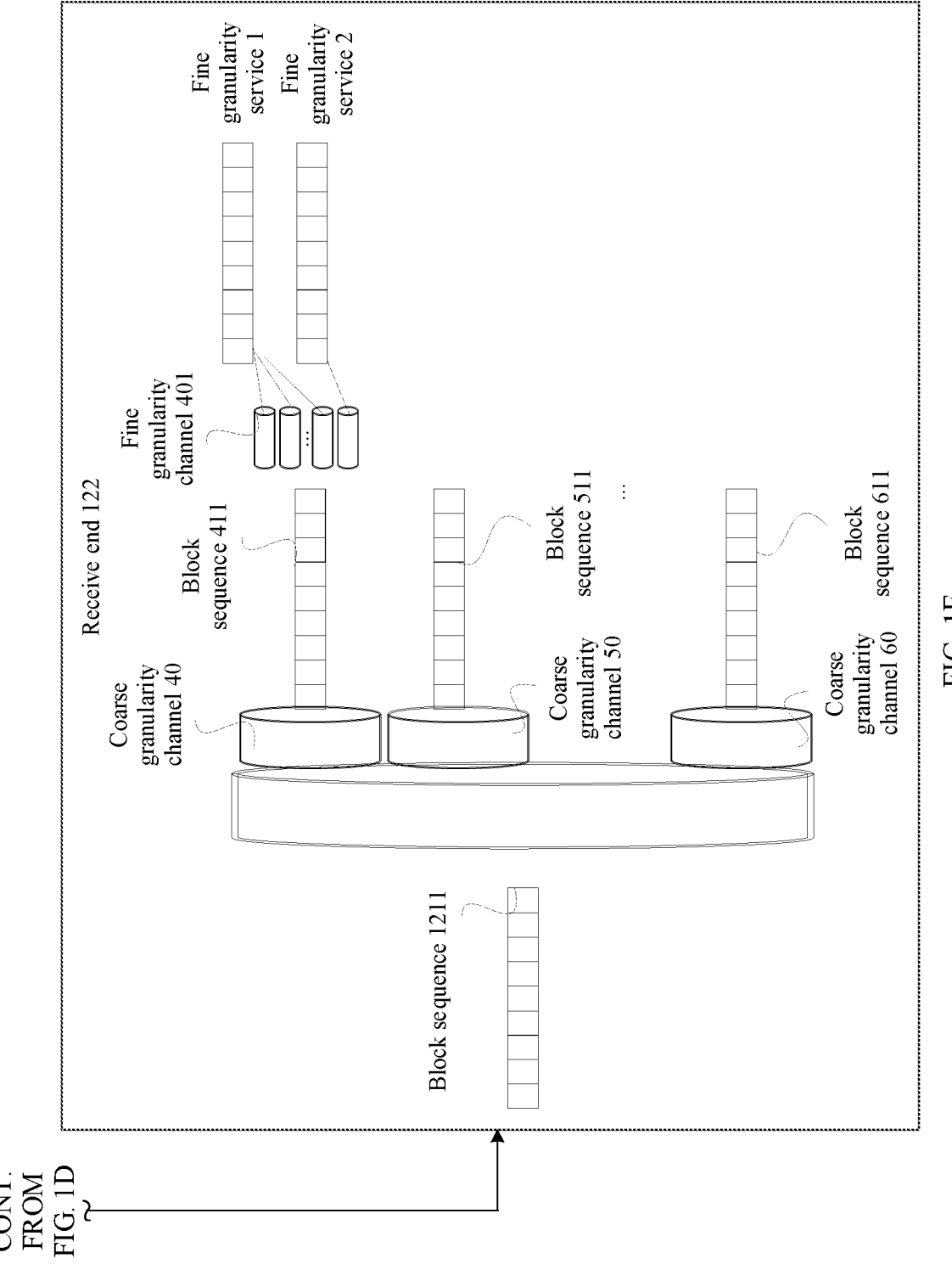

FIG. 1D and FIG. 1E are a schematic diagram of an example of a possible data transmission procedure based on FIG. 1C. As shown in FIG. 1D and FIG. 1E, a coarse granularity channel 40 is divided into 480 fine granularity channels 401. Each of the fine granularity channels corresponds to one sub-slot resource. A block sequence of each fine granularity service is multiplexed based on a correspondence between the fine granularity service and a sub-slot, to obtain a block sequence 411 corresponding to the coarse granularity channel 40. The transmit end 121 includes 20 slots, and each coarse granularity channel corresponds to one slot. In addition to the coarse granularity channel 40, another coarse granularity channel is used to carry a coarse granularity service. There is a correspondence between the coarse granularity service and a slot. In other words, there is a correspondence between the coarse granularity service and each coarse granularity channel. Then, a block sequence (for example, a block sequence 411, a block sequence 511 corresponding to a coarse granularity channel 50, and a block sequence 611 corresponding to a coarse granularity channel 60 that are shown in the figure) corresponding to each coarse granularity channel is multiplexed to obtain a block sequence 1211. Then, the block sequence 1211 is transmitted to the receive end 122.

As shown in FIG. 1E, the receive end 122 demultiplexes the block sequence 1211 to obtain the block sequence corresponding to each coarse granularity channel, for example, the block sequence 411, the block sequence 511, and the block sequence 611 that are shown in the figure. In FIG. 1E, the receive end 122 further demultiplexes the block sequence 411 to obtain a fine granularity service 1 and a fine granularity service 2.

However, it should be noted that, as an intermediate node, for the intermediate node, the intermediate node may demultiplex a block sequence output from a coarse granularity channel again, to obtain a block sequence of a fine granularity service. In this case, the intermediate node may be referred to as a coarse granularity node, or may be referred to as a fine granularity node. In another case, the intermediate node may not demultiplex a block sequence output from a coarse granularity channel, but directly multiplexes the block sequence 411 corresponding to the coarse granularity channel 40 with data of another service and transmits a result to a next hop. In this case, the intermediate node may be referred to as a coarse granularity node, but cannot be referred to as a fine granularity node. To be specific, a fine granularity service is invisible to the intermediate node. This matter can be further described below with reference to FIG. 1F.

Figure 1F:
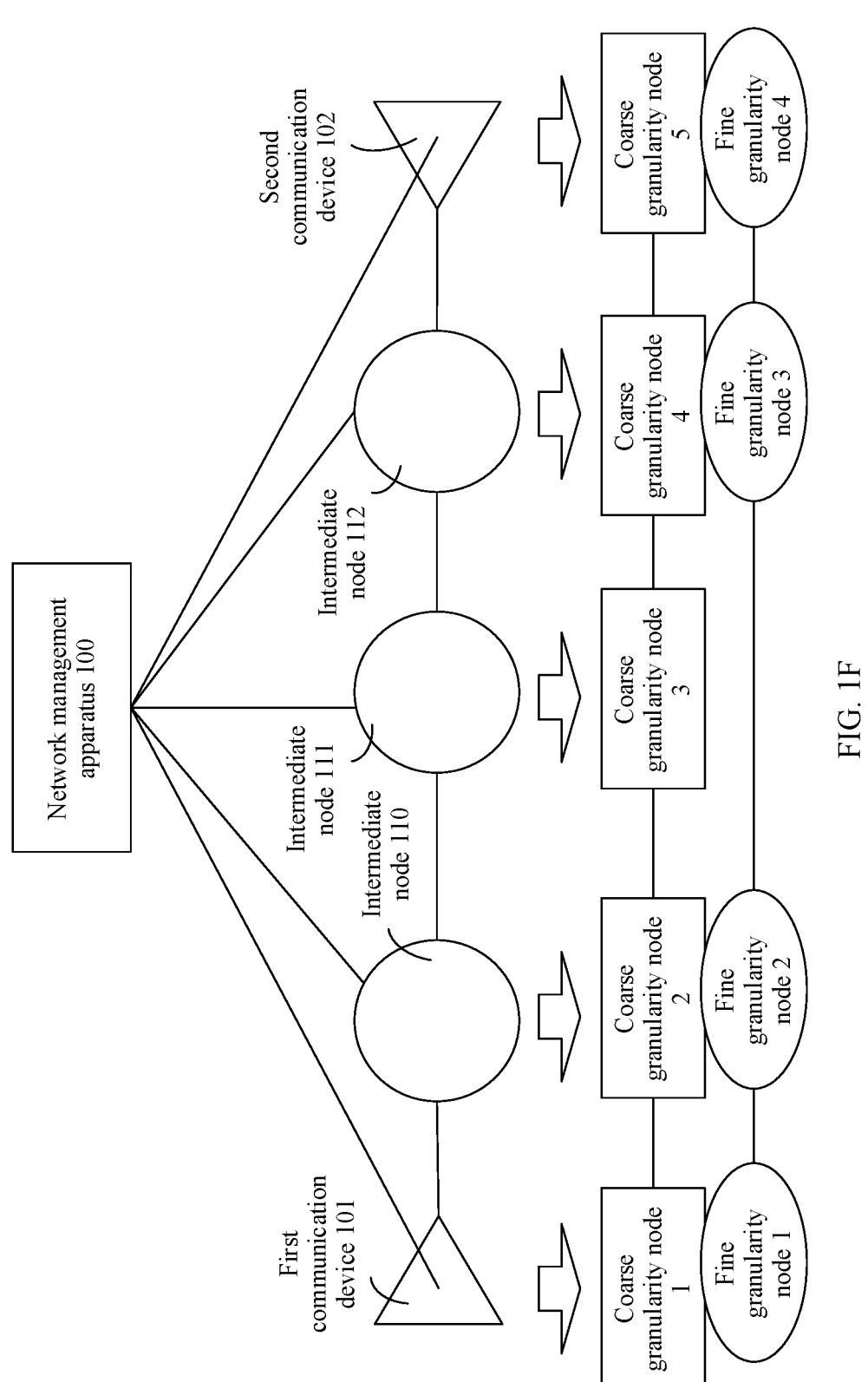
FIG. 1F shows an example of a possible data transmission solution based on FIG. 1A.

FIG. 1F shows an example of a possible data transmission solution based on FIG. 1A. As shown in FIG. 1F, the first communication device 101 serves as the transmit end 121, multiplexes a fine granularity service carried on a coarse granularity channel, and multiplexes multiplexed data again with a service on another coarse granularity channel. The first communication device 101 transmits a coarse granularity service obtained by multiplexing to the intermediate node 110 (in this case, the intermediate node 110 serves as the receive end 122). It can be learned that the first communication device 101 is a coarse granularity node and also a fine granularity node. The intermediate node 110 demultiplexes received data for a first time to obtain data corresponding to each coarse granularity channel, and the intermediate node 110 further demultiplexes the data corresponding to the coarse granularity channel again to obtain a fine granularity service. It can be learned that the intermediate node 110 is a coarse granularity node and also a fine granularity node.

Further, the intermediate node 110 in FIG. 1F serves as the transmit end 121, multiplexes a fine granularity service carried on a coarse granularity channel, multiplexes multiplexed data again with a service on another coarse granularity channel, and transmits multiplexed data to the intermediate node 111 (in this case, the intermediate node 111 serves as the receive end 122). The intermediate node 111 demultiplexes received data once to obtain data corresponding to each coarse granularity channel. The intermediate node 111 does not need to demultiplex the data corresponding to the coarse granularity channel again, that is, does not need to acquire each fine granularity service, but directly transmits the data corresponding to each coarse granularity channel to the intermediate node 112. It can be learned that the intermediate node 111 is only a coarse granularity node but not a fine granularity node. Other descriptions are similar to those provided above. Details are not described again.

It can be learned from the content shown in FIG. 1F that, with fine granularity client transparency, a coarse granularity node, for example, the intermediate node 111 that serves as a coarse granularity node 3, does not perceive a fine granularity service, but only forwards a service on a coarse granularity channel. In a fine granularity switching mode, a coarse granularity node, for example, the first communication device 101 that serves as a coarse granularity node 1 and a fine granularity node 1, the intermediate node 110 that serves as a coarse granularity node 2 and a fine granularity node 2, the intermediate node 112 that serves as a coarse granularity node 4 and a fine granularity node 3, and the second communication device 102 that serves as a coarse granularity node 5 and a fine granularity node 4, perceives a fine granularity, and demultiplexes (or may be referred to as decapsulation) a fine granularity service for forwarding. In a possible implementation, for a coarse granularity node, there may be three-end links, for example, three links between the coarse granularity node 1 and the coarse granularity node 2, between the coarse granularity node 2 and the coarse granularity node 3, between the coarse granularity node 3 and the coarse granularity node 4, and between the coarse granularity node 4 and the coarse granularity node 5. For a fine granularity node, there is only one end-to-end link, for example, a link between the fine granularity node 1 and the fine granularity node 4. It should be noted that, a total bandwidth of a fine granularity channel is adjusted only at a first node on each coarse granularity link, for example, between the coarse granularity node 1 and the coarse granularity node 2, between the coarse granularity node 2 and the coarse granularity node 4, or between the coarse granularity node 4 and the coarse granularity node 5, and is adjusted only at an adjacent node of a fine granularity node, for example, between the fine granularity node 1 and the fine granularity node 2, between the fine granularity node 2 and the fine granularity node 3, and between the fine granularity node 3 and the fine granularity node 4.

It should be noted that the solution provided in this embodiment of this disclosure may be applied to a case in which there is only a coarse granularity channel, that is, the coarse granularity channel is not divided into fine granularity channels. The solution may also be applied to a case in which there are a coarse granularity channel and a fine granularity channel. This is not limited in embodiments of this disclosure. For ease of description below, the case in which there are a coarse granularity channel and a fine granularity channel is described below.

Some nouns and terms used in embodiments of this disclosure are described below.

(1) Block:

A block mentioned in embodiments of this disclosure is one bit or a plurality of continuous bits, and information carried in a block may be information carried in a bit included in the block. The block in embodiments of this disclosure may also have another replaceable name, for example, may be otherwise called a data unit, or may be otherwise called a flit. It should be noted that some embodiments in embodiments of this disclosure described with a block as an example are also applicable to a scenario with flits.

The block in embodiments of this disclosure may include two types, that is, a data block and a control block. A bit in the data block may be used to carry an actual data payload, and a bit in the control block may be used to carry control information.

The control block may be further divided into a plurality of types of blocks, for example, a header block, a termination block, an idle block, an operations, maintenance, and management block, an error block, and a low power block.

FIG. 2A is a schematic diagram of an example of a structure of a block in a 64B/66B coding format defined in a standard. As shown in FIG. 2A, the block is defined in the IEEE Std 802.3-2018.IEEE Standard for Ethernet SECTION SIX. As shown in FIG. 2A, a synchronization header of a block includes a $0^{th}$ bit and a $1^{st}$ bit of the block, and there are two cases of the synchronization header of the block, that is, 01 and 10. A block with a synchronization header that is 01 is referred to as a data block, and the data block may be denoted as a D block. A block with a synchronization header that is 10 is referred to as a control block. A field DO of the control block occupies 8 bits, and may be referred to as a type field of the control block.

The control block may include a header block, a termination block, an ordered set block (or an O block), an idle block (or an IDLE block), an error block, a low power block, and the like. In this embodiment of this disclosure, a header block that is a block with a synchronization header that is 10 and a type field that is 0x78 in FIG. 2A may be denoted as an S block. In embodiments of this disclosure, a termination block may be denoted as a T block, including blocks each with a synchronization header that is 10 and a type field that is 0x87, 0x99, 0xAA, 0xB4, 0xCC, 0xD2, 0xE1, or 0xFF in FIG. 2A. In this embodiment of this disclosure, an O block is a block with a synchronization header that is 10 and a type field that is 0x4B in FIG. 2A. In this embodiment of this disclosure, a control block, in control blocks, that is not an S block or a T block may be denoted as a C block.

Figure 2B:
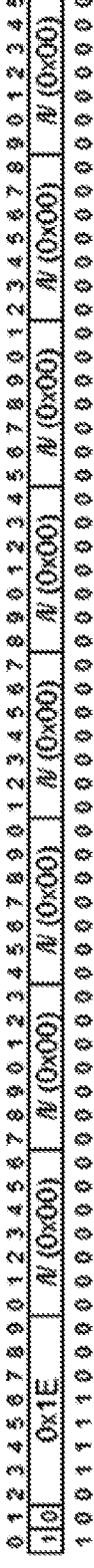
FIG. 2B is a structural form of an idle block according to an embodiment of this disclosure.
Figure 2C:
FIG. 2C is a structural form of an error block according to an embodiment of this disclosure.
Figure 2D:
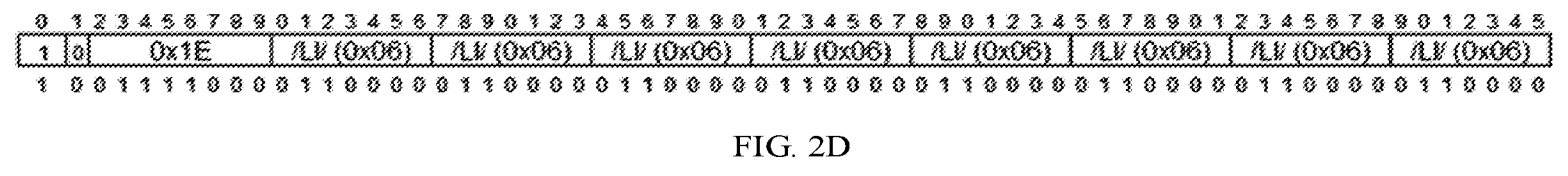

FIG. 2B shows an example of a structure form of an idle block, FIG. 2C shows an example of a structure form of an error block, and FIG. 2D shows an example of a structure form of a low power block. As shown in FIG. 2B, FIG. 2C, and FIG. 2D, synchronization headers of the idle block, the error block, and the low power block are all 10, and other content is shown in the figure. The block in embodiments of this disclosure is described by using the structural form of the block shown in FIG. 2A as an example. However, embodiments of this disclosure are also applicable to a block form, for example, 8B/10B or 256B/257B, defined in another standard.

(2) Block Sequence:

In embodiments of this disclosure, a data stream formed in units of blocks is referred to as a block sequence, for example, a first block sequence and a second block sequence in embodiments of this disclosure. The block sequence in embodiments of this disclosure may also have another name, for example, a block stream. A name is not limited in embodiments of this disclosure.

For one block sequence in the "first block sequence", the "second block sequence", a "third block sequence", a "fourth block sequence", and a "fifth block sequence" in embodiments of this disclosure, there may be a plurality of forms of a series of continuous blocks in the block sequence, for example:

. . . SDDDD . . .

. . . DDDDD . . .

. . . DDDT . . .

. . . DDDTI . . .

. . . TIIISDDD . . .

. . . TOS . . .

. . . TIOS . . .

In the foregoing examples, S represents a header block, D represents a data block, T represents a termination block, I represents an idle block, and O represents an O block. It can be learned from the foregoing examples that the block sequence in embodiments of this disclosure may include a plurality of block types, for example, an S block, a D block, and a T block, may further include, for another example, an I block and an O block. A specific quantity of a type of blocks is not limited herein, and possible forms of a series of continuous blocks in a block sequence in embodiments of this disclosure are simply listed.

(3) Frame Format in a Flex Ethernet Protocol:

A FlexE channel of a 5 Gbps slot granularity is used as a coarse granularity channel for description. It should be noted that, in embodiments of this disclosure, a bandwidth of a coarse granularity channel is not limited to 5 Gbps, for example, may alternatively be 6 Gbps or 7 Gbps.

FIG. 2E is a schematic diagram of an example of a structure of a frame format in a Flex Ethernet protocol according to an embodiment of this disclosure. A frame format in the block sequence 1211 output from the transmit end 121 in FIG. 1D may be the frame format in the Flex Ethernet protocol. As shown in FIG. 2E, a fixed frame format may be constructed based on transmission over a physical port according to the Flex Ethernet protocol, and slots may be divided based on time division multiplexing (TDM). For a 100 GE PHY port, a data block sequence may include 20 64B/66B blocks that correspond to 20 slots in each cycle. Each of the slots has a bandwidth of 5 Gbps and is referred to as one slot.

As shown in FIG. 2E, a Flex Ethernet may be based on a time division multiplexing frame structure constructed by using the 64B/66B blocks. Data on each physical layer (PHY) in the FlexE is aligned by periodically inserting a FlexE overheads block (OH). For example, one 66B overheads block FlexE OH may be inserted every 1023×20 66B payload data blocks.

As shown in FIG. 2E, 66B blocks in eight rows (each row includes one OH block and 1023×20 data blocks) form a protocol frame (the protocol frame may also be referred to as a basic frame, a base frame, a single frame, or the like) in the Flex Ethernet protocol. As shown in FIG. 2E: 32 protocol frames in the Flex Ethernet protocol form a multiframe in the Flex Ethernet protocol.

In a possible implementation, in a first OH block in the protocol frame in the Flex Ethernet protocol, a 0x4B field including bits 0 to 7 and a 0x5 field including bits 32 to 35 jointly form a frame header indication tag field of a FlexE frame overheads block. In the FlexE OH, two management channels may be defined in the OH, and the management channels may be used to run management links and OAM communication links in two Ethernet protocols of 1.2 Mb/s and 1.8 Mb/s that are coded based on a 64B/66B block sequence. Further, in this embodiment of this disclosure, 64B/66B coding may be used in a scenario of a 100 GE physical layer.

The International Telecommunication Union (ITU-T) MTN reuses a FlexE frame structure. Therefore, the frame structure of the MTN is the same as that of the FlexE frame structure.

(4) Flexible fgBU Frame Format:

In embodiments of this disclosure, at least two fine granularity channels may be obtained by dividing a coarse granularity channel. A bandwidth of one of the fine granularity channels is less than a bandwidth of the coarse granularity channel to which the fine granularity channel belongs. In embodiments of this disclosure, an example in which a coarse granularity channel is 5 Gbps and a fine granularity channel is 10 Mbps is used for description. Bandwidths corresponding to two coarse granularity channels may be the same or different. Bandwidths of any two fine granularity channels obtained by dividing a coarse granularity channel may be the same or different. To describe embodiments of this disclosure more clearly, an example in which a bandwidth of each coarse granularity channel is 5 Gbps and a bandwidth of each fine granularity channel is 10 Mbps is used below for description. One slot corresponding to one coarse granularity channel may be divided into 480 sub-slots. A correspondence between the 480 sub-slots and a fine granularity service may be further established, so that data of each fine granularity service may be multiplexed based on the correspondence.

Figure 2F:
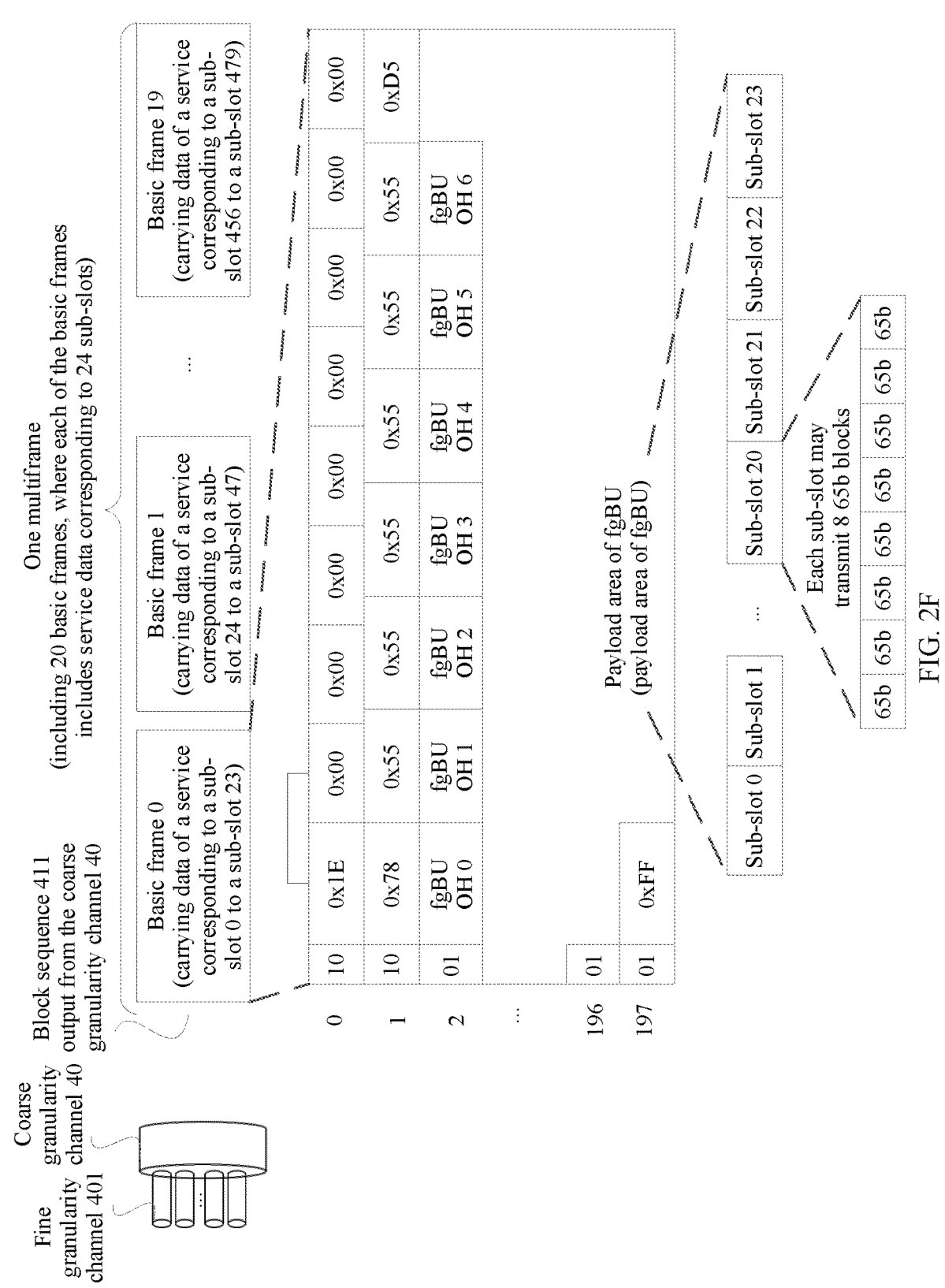
FIG. 2F shows a flexible fine granularity basic unit (fgBU) frame format according to an embodiment of this disclosure.

FIG. 2F shows an example of a flexible fgBU frame format according to an embodiment of this disclosure. A block sequence output from a coarse granularity channel 40 is obtained by multiplexing data on a plurality of fine granularity channels. That is, a frame format in a block sequence 411 output from the coarse granularity channel 40 may be referred to as an fgBU frame format. As shown in FIG. 2F, the coarse granularity channel 40 is divided into 480 fine granularity channels 401, and one fine granularity channel corresponds to one sub-slot. Each fine granularity service is multiplexed based on a correspondence between a sub-slot and the fine granularity service to obtain a block sequence after multiplexing (the figure shows the block sequence output from the coarse granularity channel 40).

The block sequence obtained by multiplexing the fine granularity service includes at least one multiframe, where one multiframe includes 20 basic frames (for example, a basic frame 0 to a basic frame 19 in FIG. 2F), and one basic frame includes 24 sub-slot resources. One multiframe may include all 480 sub-slot resources of the coarse granularity channel. A basic frame in embodiments of this disclosure may also be referred to as an fgBU or a fine granularity base frame.

As shown in FIG. 2F, a frame structure of the basic frame may include one S block, 195 D blocks, and one T block, with a total length of 197 66B blocks. The first data block after the S block carries overheads information, and a total of 7×8 bits=56 bits can carry the overheads information. In the 24 sub-slot resources included in a single basic frame, eight 65-bit blocks may be transmitted on one sub-slot resource.

(5) Rate Adaptation:

Based on the system architecture shown in FIG. 1A, FIG. 2G and FIG. 2H are a schematic diagram of an example of a possible bandwidth increase solution according to an embodiment of this disclosure. As shown in FIG. 2G and FIG. 2H, when a bandwidth for a service needs to be increased, for example, when the service needs to be transmitted from the first communication device 101 to the second communication device 102 via the intermediate nodes sequentially, a bandwidth, for the service, corresponding to each of the devices needs to be increased in a specific sequence. For example, as shown in FIG. 2G and FIG. 2H, before a bandwidth adjustment, the bandwidth, for the service, between each of the devices is the same. The bandwidth for the service between the second communication device 102 and the intermediate node 112 may be first adjusted. After the adjustment, it can be seen that there is only a bandwidth increase between the intermediate node 112 and the second communication device 102, while bandwidths between other devices remain unchanged. Similarly, as shown in FIG. 2G and FIG. 2H, the bandwidth corresponding to the service between the intermediate node 111 and the intermediate node 112 is then increased sequentially. Then, the bandwidth corresponding to the service between the intermediate node 110 and the intermediate node 111 is increased, and finally the bandwidth for the service between the first communication device 101 and the intermediate node 110 is increased. In this manner of bandwidth adjustment, a service loss can be avoided. To be specific, a case in which a larger bandwidth is used to correspond to a smaller bandwidth (that is, a bandwidth on an input side is greater than a bandwidth on an output side) does not occur, and only a case in which a smaller bandwidth is used to correspond to a larger bandwidth (that is, the bandwidth on the input side is less than the bandwidth on the output side).

It should be noted that, in FIG. 1F, an example in which the intermediate node 111 is the coarse granularity node 3 is used. In this case, a bandwidth for a coarse granularity service may be adjusted according to the solution shown in FIG. 2G and FIG. 2H. If a bandwidth for a fine granularity service needs to be adjusted based on the example shown in FIG. 1F, only bandwidths between the fine granularity nodes in FIG. 1F need to be adjusted. An overall solution is similar to content shown in FIG. 2G and FIG. 2H, and an only difference is that the intermediate node 111 is removed. For the fine granularity service, the intermediate node 111 is invisible. Therefore, no related operation needs to be performed on the intermediate node 111.

It should be noted that the solution provided in this embodiment of this disclosure is applicable to an adjustment of a service with any bandwidth, may be applied to a coarse granularity service, for example, of 5 Gbps, and may further be applied to a fine granularity service, for example, of 10 Mbps.

It should be noted that, when the bandwidth between the intermediate node 112 and the second communication device 102 is adjusted, the second communication device 102 is a downstream node, and the intermediate node 112 is an upstream node. In this case, in a possible implementation, the second communication device transmits a DD message to the intermediate node 112. After receiving the DD message, the intermediate node 112 transmits an REQ message. The REQ message in this embodiment of this disclosure may be understood as a request message. REQ is short for request. The request message is used to request for permitting specific content. In FIG. 2G and FIG. 2H, the REQ message may be used to request for an increase of a bandwidth for a service. The second communication device returns an ACK message to the intermediate node 112. In this embodiment of this disclosure, the ACK message may be understood as a response message, where ACK is short for acknowledgment, and is used to indicate that the content requested in the REQ is permitted. After receiving the ACK message, the intermediate node 112 transmits a CMT message. The CMT message may be understood as a confirmation message. In a possible implementation, after transmitting three CMT messages, the intermediate node 112 starts to enable the content requested in the REQ in a next multiframe. Another signaling interworking process between two devices is similar. Details are not described again.

Figure 2I:
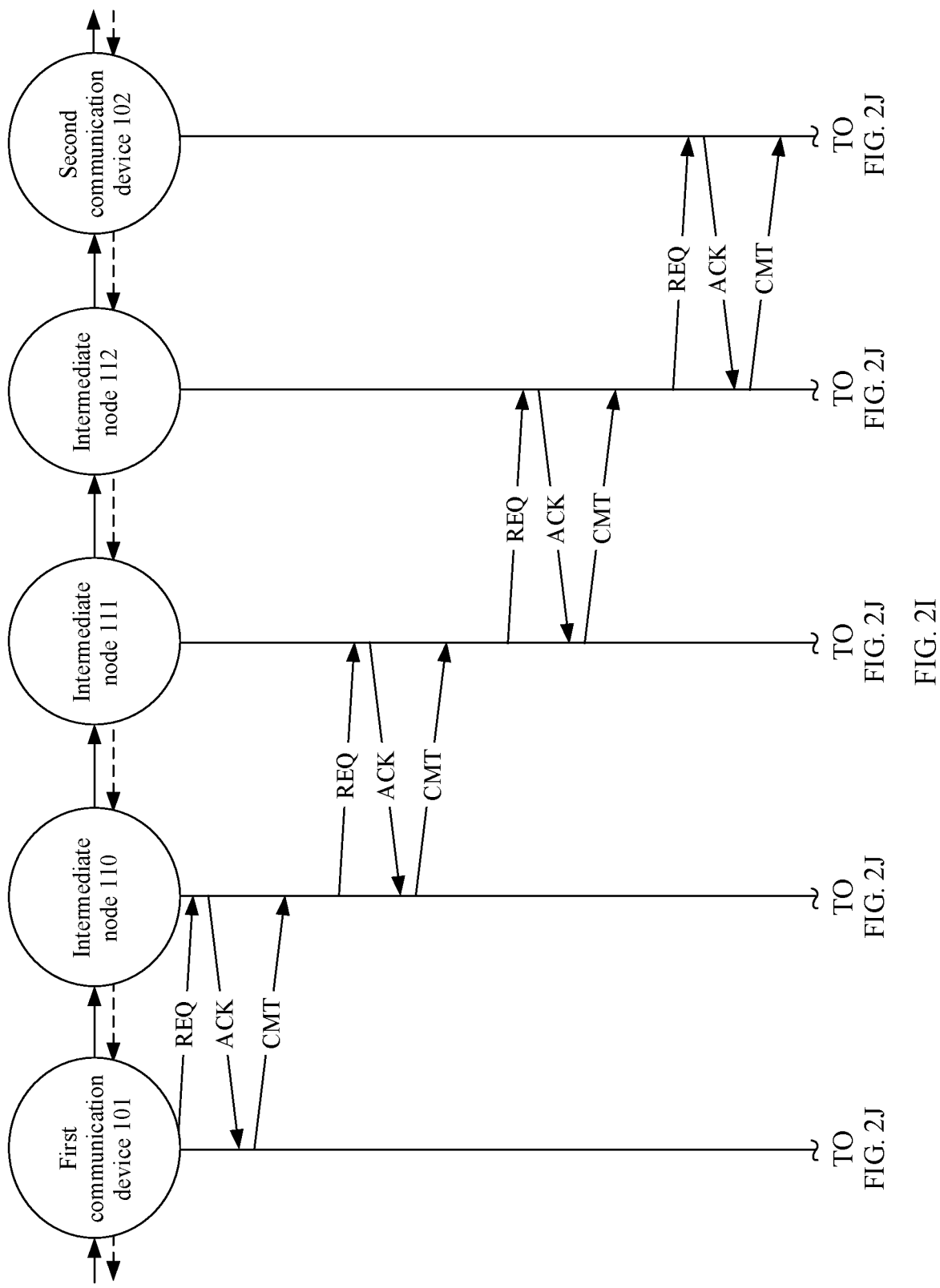

Similar to FIG. 2G and FIG. 2H, based on the system architecture shown in FIG. 1A, FIG. 2I and FIG. 2J are a schematic diagram of an example of a possible bandwidth reduction solution according to an embodiment of this disclosure. It should be noted that, when a bandwidth is reduced, a bandwidth adjustment sequence is as follows. First, a bandwidth between the first communication device 101 and the intermediate node 110 is reduced, a bandwidth between the intermediate node 110 and the intermediate node 111 is then reduced, a bandwidth between the intermediate node 111 and the intermediate node 112 is then reduced, and a bandwidth between the intermediate node 112 and the second communication device 102 is then reduced. Related descriptions are similar to those in FIG. 2G and FIG. 2H. Details are not described again. It can be seen that, when a bandwidth is reduced, in the bandwidth adjustment sequence, a service loss can be avoided. To be specific, a case in which a larger bandwidth is used to correspond to a smaller bandwidth (that is, a bandwidth on an input side is greater than a bandwidth on an output side) does not occur, and only a case in which a smaller bandwidth is used to correspond to a larger bandwidth (that is, the bandwidth on the input side is less than the bandwidth on the output side).

Figure 2K:
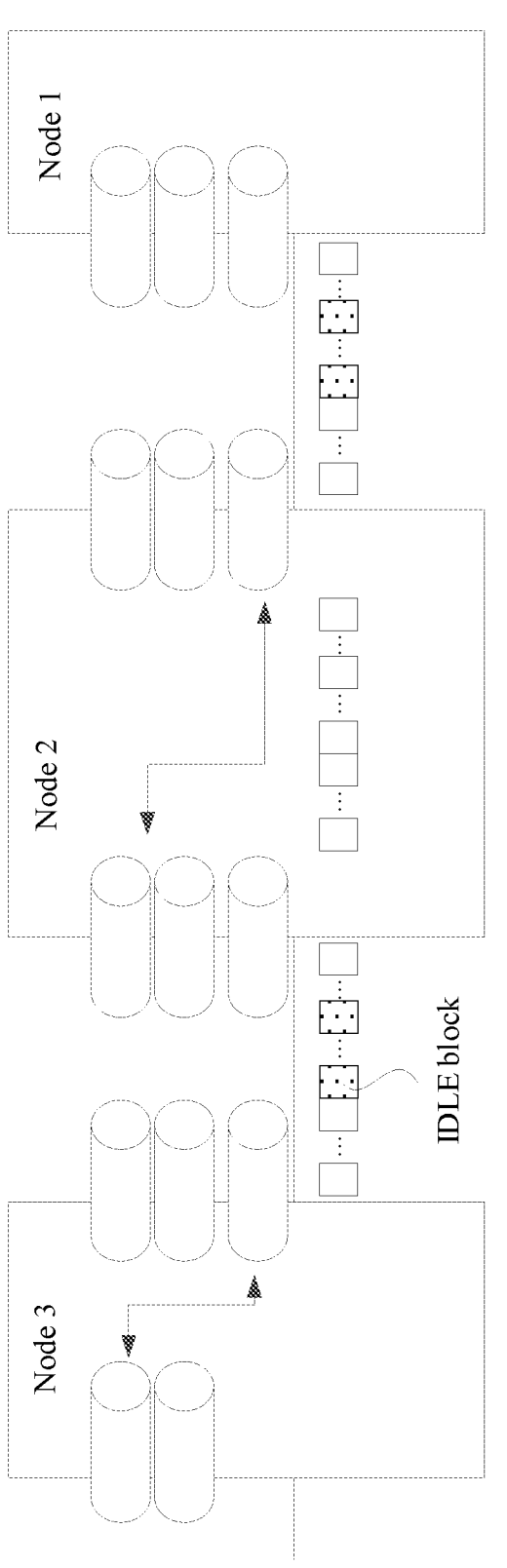
FIG. 2K is a schematic diagram of a possible data transmission solution to which an embodiment of this disclosure is applicable.

In the service bandwidth adjustment solutions shown in FIG. 2G and FIG. 2H and FIG. 2I and FIG. 2J, because the bandwidths are adjusted in a specific sequence, there may be a device, and a bandwidth corresponding to a service in a block sequence received by the device is different from a bandwidth corresponding to the service in a block sequence transmitted by the device. FIG. 2K is a schematic diagram of an example of a possible data transmission solution to which an embodiment of this disclosure is applicable. It should be noted that, in the example shown in FIG. 2K, if a slot resource is a coarse granularity slot, for example, if a bandwidth for a service is increased from 10 Gbps to 15 Gbps, a node 1 may be the foregoing second communication device 102, a node 2 may be the foregoing intermediate node 112, a node 3 may be the foregoing intermediate node 111, and a previous hop of the node 3 may be the foregoing intermediate node 110. If a slot resource is a fine granularity slot, for example, if a bandwidth for a service is increased from 20 Mbps to 30 Mbps, the node 1 may be the second communication device 102, the node 2 may be the intermediate node 112, the node 3 may be the intermediate node 110, and the previous hop of the node 3 may be the first communication device 101.

As shown in FIG. 2K, a quantity of slot resources for a service has been adjusted to 3 between the node 1 and the node 2, and between the node 2 and the node 3, while there has been no adjustment between the node 3 and the previous hop, and a quantity of slot resources corresponding to the service is still 2. Therefore, for the node 3, a service bandwidth at an ingress port on the left side is two slot resources, and a service bandwidth at an egress port on the right side is three slot resources. Rates of the service are inconsistent. Therefore, for rate adaptation, a block needs to be inserted into the three slot resources corresponding to the service that are transmitted from the node 3.

In addition, a service bandwidth can be actually increased only after a channel bandwidth is increased. When a service bandwidth is not actually increased, a slot resource needs to be first added for the service to increase the bandwidth. However, because actually there has been less than enough data of the service, a block (for example, an IDLE block) needs to be inserted into a newly increased part of bandwidth. In other words, it can be understood as a need to fill the IDLE block to extend the newly increased part of bandwidth yet with a client service. For example, between the node 2 and the node 3, because a service has actually been less than enough to satisfy the three slot resources, IDLE may be inserted to satisfy the bandwidth. For example, a slot resource is a sub-slot. For the node 3, a bandwidth at a receive side is 20 Mbps, and a bandwidth at a transmit side is 30 Mbps. The node 3 decapsulates a received coarse granularity frame to restore a coarse granularity slot and service data. In addition, for the coarse granularity slot that carries a fine granularity, a fine granularity frame fgBU is identified and deinterleaved to restore a first block sequence (that may be 65-bit/66-bit coded, and this is described in detail below, and therefore is not described herein) of sub-slot data of a service. Then, a frequency may be adjusted based on a frequency offset difference (that is, frequency offset adjustment), and the 65-bit block sequence is distributed to a sub-slot corresponding to a service at the transmit side. In addition, an even-numbered quantity of 65-bit blocks are inserted based on a requirement and then encapsulated into an fgBU frame for transmission.

(6) Frequency Offset Adjustment:

The frequency offset adjustment refers to a slight offset of a port rate at the Ethernet port due to a frequency offset of +/−100 parts per million (ppm). Generally, a maximum frequency offset is 200 ppm. That is, one block needs to be added to or deleted from 5,000 blocks for a frequency offset adjustment. In this embodiment of this disclosure, a block in a block sequence may be added or deleted based on a frequency offset adjustment requirement.

Figure 3A:
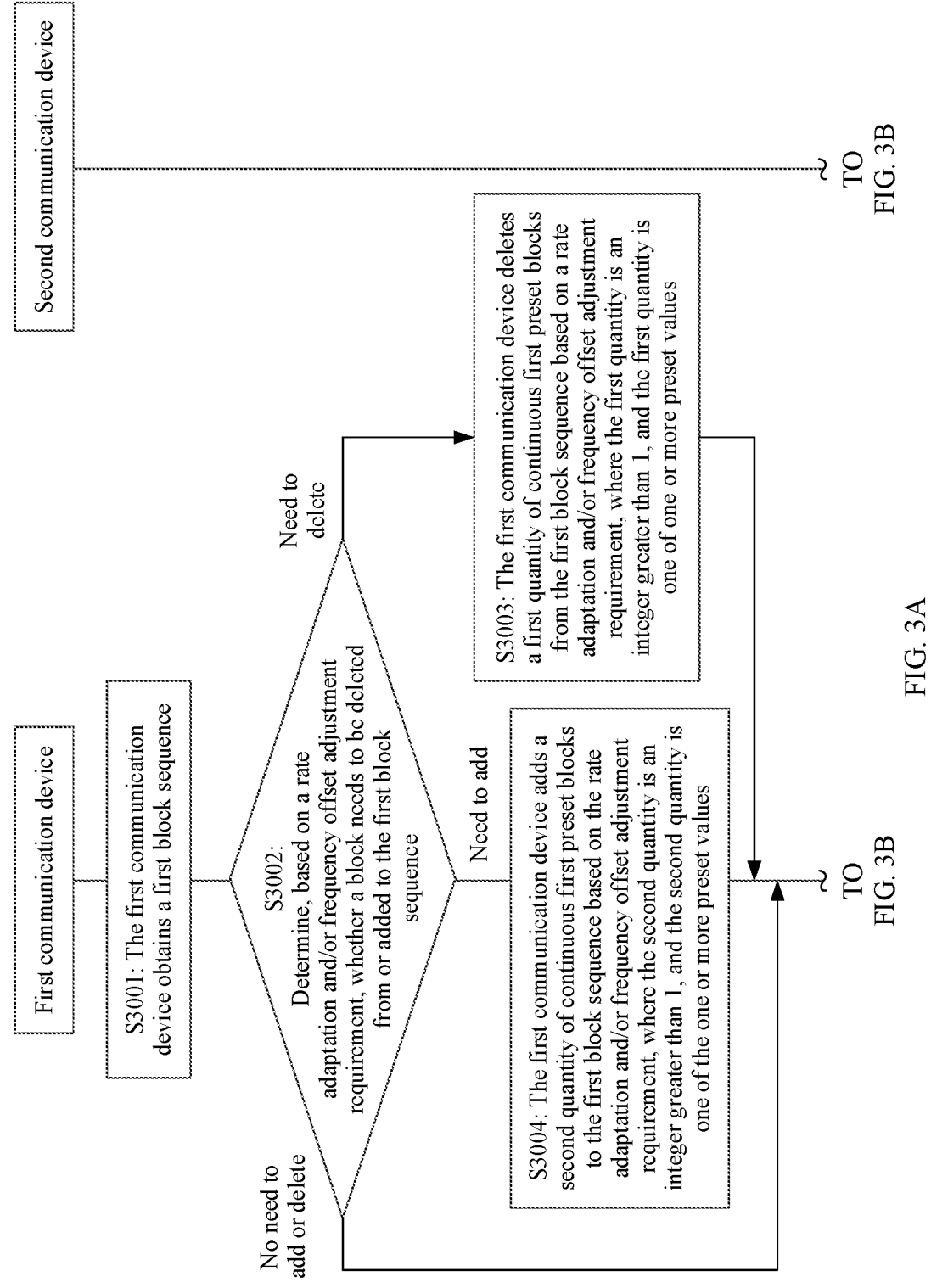
FIG. 3A and FIG. 3B are a schematic flowchart of a possible communication method according to an embodiment of this disclosure.
Figure 3B:
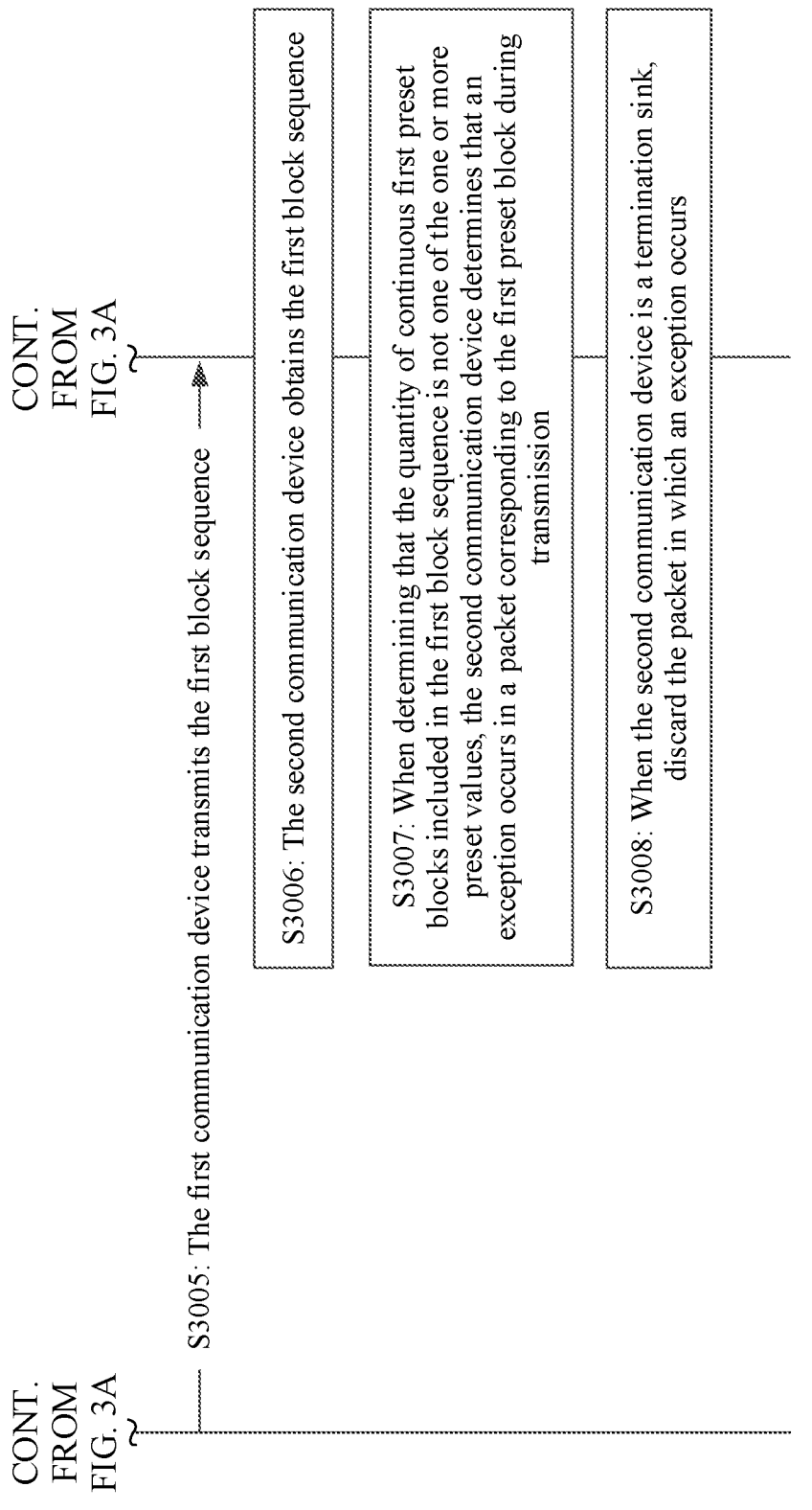

Based on the foregoing descriptions, FIG. 3A and FIG. 3B are a schematic flowchart of an example of a possible communication method according to an embodiment of this disclosure. The method is applicable to a first communication device and a second communication device. The first communication device and the second communication device may be any two nodes in the first communication device 101, the intermediate node 110, the intermediate node 111, the intermediate node 112, and the second communication device 102 that are shown in FIG. 1A. To describe this embodiment of this disclosure more clearly, an example in which the first communication device is the transmit end 121 in FIG. 1C and the second communication device is the receive end 122 in FIG. 1C is used for description below. As shown in FIG. 3A and FIG. 3B, the method includes the following steps.

Step S3001: The first communication device obtains a first block sequence.

Step S3002: The first communication device determines, based on a rate adaptation and/or frequency offset adjustment requirement, whether a block needs to be deleted from or added to the first block sequence.

When a block needs to be deleted from the first block sequence, step S3003 is performed.

When a block needs to be added to the first block sequence, step S3004 is performed.

When no block needs to be deleted from or added to the first block sequence, step S3005 is performed.

Step S3003: The first communication device deletes a first quantity of continuous first preset blocks from the first block sequence based on a rate adaptation and/or frequency offset adjustment requirement, where the first quantity is an integer greater than 1, and the first quantity is one of one or more preset values.

Step S3004: The first communication device adds a second quantity of continuous first preset blocks to the first block sequence based on the rate adaptation and/or frequency offset adjustment requirement, where the second quantity is an integer greater than 1, and the second quantity is one of the one or more preset values.

In this embodiment of this disclosure, the first preset blocks are at least one of the following: idle blocks, local fault blocks, low power blocks, or custom blocks.

In a possible implementation, a quantity of the first preset blocks in the first block sequence is used to indicate whether an exception occurs in a packet corresponding to the first preset blocks during transmission. In another possible implementation, the quantity of first preset blocks in the first block sequence is used to indicate, to a device that receives the first block sequence, whether an exception occurs in the packet corresponding to the first preset blocks during transmission.

In this embodiment of this disclosure, the preset value may include one value, or may include a group of values. When the preset value includes a group of values, the values may be, for example, several specified values, or may be a group of values that satisfy a particular rule. For example, it may be specified that the preset value is an even number, for example, a group of even numbers, that is, 2, 4, 6, 8, and so on. The first quantity and the second quantity do not need to be the same or different, provided that the first quantity and the second quantity each are an even number. In addition, the receive end only needs to determine whether a quantity of first preset blocks included in one data unit is an even number, and adds the second preset block to the data unit corresponding to the packet if the quantity is not an even number. For another example, it may be specified that the preset value satisfies a preset calculation formula. For example, the calculation formula may be 3 to the power of n, or 5 to the power of n, where n is a positive integer. A determining rule is similar to the foregoing descriptions. Details are not described again.

Step S3005: The first communication device transmits the first block sequence.

Step S3006: The second communication device obtains the first block sequence.

Step S3007: When the quantity of continuous first preset blocks included in the first block sequence is not one of the one or more preset values, determine that an exception occurs in the packet corresponding to the first preset blocks during transmission.

In a possible example, when the receive end counts the first preset blocks, if the quantity of continuous first preset blocks is not the preset value, where for example, the preset value is an even number, but there are one or three first preset blocks, a value obtained by counting the continuous first preset blocks is not an even number, and it indicates that an exception occurs in a packet corresponding to positions of the first preset blocks.

Usually, one packet corresponds to a series of continuous blocks. Therefore, the positions of the first preset blocks may be positions of a series of continuous blocks corresponding to one packet (that is, the first preset blocks inserted by the transmit end into the series of continuous blocks corresponding to one packet). In this case, the packet corresponding to the first preset blocks may be determined.

In another possible case, a gap between two packets further includes another series of continuous blocks, and the first preset blocks included in the gap between the packets may be counted, or may not be counted. When the first preset blocks are counted, if a quantity of the continuous first preset blocks is not the preset value, it is determined that an exception occurs in data corresponding to positions of the first preset blocks during transmission. The data corresponding to the positions of the first preset blocks may be data corresponding to at least one block adjacent to, that is, before or after, the first preset blocks, or may be data corresponding to a block in the gap between the two packets corresponding to the first preset blocks.

In a possible implementation, for one data unit in the at least one data unit, when the data unit includes the first preset block, and a quantity of first preset blocks included in the data unit is not one of the one or more preset values, at least one second preset block is inserted into the data unit, where the second preset block is used to indicate that an exception occurs in a packet corresponding to the data unit during transmission. The manner of inserting the second preset block to indicate that an exception occurs in the packet is only a possible example. There may be another manner of alarming, for example, an alarm may be given by inserting a marker, generating alarm information, or the like.

In a possible implementation, the first block sequence includes at least one data unit, and one data unit includes a series of continuous blocks. For one data unit in the at least one data unit, the second communication device inserts, when the data unit includes the first preset block, and a quantity of first preset blocks included in the data unit is not one of the one or more preset values, at least one second preset block into the data unit, where the second preset block is used to indicate that an exception occurs in a packet corresponding to the data unit during transmission.

In a possible implementation, that an exception occurs in the packet during transmission may mean that bit flip occurs in one or more first preset blocks corresponding to the packet during transmission, and consequently, the quantity of first preset blocks corresponding to the packet is not the preset value.

It should be noted that, if the data unit does not include the first preset block, or the quantity of first preset blocks included in the data unit is one of the one or more preset values, it is determined that bit flip has not occurred in the first preset block in the data unit, and the second preset block does not need to be added to the data unit.

In this embodiment of this disclosure, the second communication device is the receive end. In a possible implementation, when the second communication device is an intermediate node, the quantity of first preset blocks in the first block sequence may not be counted. In other words, attention may not be paid to the quantity of first preset blocks included in a second block sequence, and step S3007 does not need to be performed. In another possible implementation, when the second communication device serves as an intermediate node, step S3007 may alternatively be performed. Then, the second communication device that serves as the intermediate node may transmit the first block sequence to a next hop. In this case, the node serves as the transmit end, and may transmit the first block sequence to the next hop. For details, refer to the foregoing descriptions about the first communication device. Details are not described again.

In still another possible implementation, when the second communication device is a termination sink, after step S3007, the second communication device may further perform the following steps.

Step S3008: The second communication device discards the packet in which an exception occurs.

It can be learned from the solution shown in FIG. 3A and FIG. 3B that, in this embodiment of this disclosure, the receive end may count a quantity of first preset blocks in one data unit, for example, by using a 2-bit counter. Whether an exception occurs in the packet corresponding to the first preset blocks during transmission is determined based on a relationship between the quantity of first preset blocks in the received first block sequence and the preset value. If the quantity of first preset blocks in the first block sequence received by the receive end is not the preset value, it may be determined that an exception occurs in the packet corresponding to the first preset blocks during transmission. Further, the second preset block is inserted into the data unit, to ensure that the data packet fails a frame check sequence (FCS) detection, and the packet is processed as a false packet.

In a possible implementation, the second communication device may not count a quantity of first preset blocks between two data units. Usually, the first preset block inserted between the two data units is discarded, and packet processing is not affected. Therefore, attention may not be paid to the quantity.

In this embodiment of this disclosure, the first block sequence includes at least one data unit, and the data unit includes a series of continuous blocks. In this embodiment of this disclosure, a data unit in the at least one data unit in the first block sequence satisfies one of the following.

The data unit includes a header block and at least one data block, the data unit includes a header block, at least one data block, and a termination block, the data unit includes at least one data block and a termination block, or the data unit includes at least one data block.

In this embodiment of this disclosure, one data unit may refer to a series of continuous blocks obtained by coding a packet.

In this embodiment of this disclosure, the first communication device may add or delete a first preset block between data units. Alternatively, a first preset block may be added to or deleted from a data unit. When a first preset block is added to or deleted from the data unit, it is required that a quantity of first preset blocks to be added or deleted is the preset value. In embodiments of this disclosure, "add or delete" refers to addition or deletion.

In another possible implementation, when a first preset block is added to or deleted from a gap between two adjacent data units in the first block sequence, in a possible implementation, a quantity of first preset blocks added to or deleted from the gap between the data units also needs to be one of the one or more preset values.

For example, a data unit is a series of blocks that start with an S block and ends with a T block with a D block in between. The first communication device may add or delete a first preset block at a position before an S block in a next data unit and after a T block in a previous data unit. Alternatively, a first preset block may be added or deleted before the T block in the data unit and after an S block in a data unit.

It can be learned that, in this embodiment of this disclosure, there is no need to pay attention to a position of an added or deleted first preset block when the first preset block is added or deleted. Compared with a solution in which a first preset block can be added or deleted only between interpacket gaps (IPGs), in the solution shown in FIG. 3A and FIG. 3B, a packet may not need to be cached, and a specific type of a block may not need to be identified. Therefore, a longer delay caused by packet caching can be avoided. In addition, in this embodiment of this disclosure, the first communication device may be a source end, or may be an intermediate node. In this way, regardless of which node needs rate adaptation or a frequency offset adjustment, a first preset block may be added or deleted according to the foregoing solution.

In still another possible implementation, when the gap between the two adjacent data units is a preset first gap, the quantity of continuous first preset blocks deleted from the blocks included in the first gap between the two adjacent data units in the first block sequence is the preset value.

In yet another possible implementation, when the gap between the two adjacent data units is a preset first gap, the quantity of continuous first preset blocks deleted from the blocks included in the first gap between the two adjacent data units in the first block sequence is not the preset value.

In this embodiment of this disclosure, the name "first gap" is defined. First, the first gap is a gap between two adjacent data units, and second, the first gap further needs to satisfy the following. One data unit in the two adjacent data units ends with a termination block, and the other data unit starts with a header block. In this case, a position after the termination block in one data unit and before the header block in the other data unit is referred to as the first gap. The first gap in this embodiment of this disclosure may also be referred to as an IPG.

For example, a structural form of a first data unit ends with a termination block, and another block, for example, an I block or an O block, may be further included after the termination block. A second data unit starts with a header block, and may further include another block, for example, an I block or an O block, before the header block.

Some forms of blocks in the first data unit may be the following several types:
. . . DT
. . . TI
. . . TIO
. . . TO Some forms of blocks in the second data unit may be the following several types:
SD . . .
ISD . . .
OSD . . .
OISD . . .

Based on the foregoing descriptions, in this embodiment of this disclosure, when the first preset blocks are added to or deleted from the first gap, the quantity of added or deleted continuous first preset blocks may be the preset value. In another possible implementation, because a first preset block inserted into the first gap is deleted at the termination sink, at a transmit end, when the first preset blocks are added to or deleted from the first gap, the quantity of added or deleted first preset blocks may not be limited. In other words, the quantity of added or deleted first preset blocks may be the preset value or may not be the preset value.

It can be learned from the foregoing descriptions that, in a possible implementation, when the first communication device needs to add or delete a first preset block, if the first preset block is added to an IPG or the first preset block is deleted from the IPG, there may be no limitation on a quantity. For example, if the preset value is required to be an even number, when a first preset block is added to or deleted from an IPG, an odd-numbered or even-numbered quantity of first preset blocks may be added or deleted. If a first preset block is added to or deleted from a data unit, a quantity of first preset blocks to be added or deleted needs to satisfy a requirement of the preset value. It should be noted that, in this implementation, when a first preset block is added to or deleted from an IPG, a packet needs to be cached for identifying the IPG.

In another possible implementation, when the first communication device is a source end, a first preset block may be added to or deleted from a data unit in the first block sequence, or a first preset block may be added or deleted between two data units (IPG) in the first block sequence. When the first communication device is an intermediate node, the first communication device may add or delete a first preset block only to or from an IPG. In this way, the first communication device that serves as an intermediate node may pay no attention to a quantity of added or deleted first preset blocks.

In still another possible implementation, the receive end (the second communication device) may pay no attention to a quantity of first preset blocks in a gap between data units. In another possible implementation, attention is only paid to a gap that is in gaps between data units and that is not the first gap. For example, when a gap between two adjacent data units is not the first gap, and a quantity of first preset blocks included between the two adjacent data units is not one of the one or more preset values, at least one second preset block is inserted into the gap, and the second preset block is used to indicate that an exception occurs in a block in the gap during transmission.

In still another possible implementation, for the first gap, attention may alternatively be paid to a quantity of first preset blocks in the first gap. For example, when the quantity of first preset blocks included in the first gap is not one of the one or more preset values, at least one second preset block is inserted into the first gap, and the second preset block is used to indicate that an exception occurs in a block in the first gap during transmission.

Based on FIG. 3A and FIG. 3B, FIG. 4A and FIG. 4B are a schematic flowchart of an example of another communication method according to an embodiment of this disclosure. In the method, related steps in FIG. 3A and FIG. 3B are extended as follows.

Figure 4A:
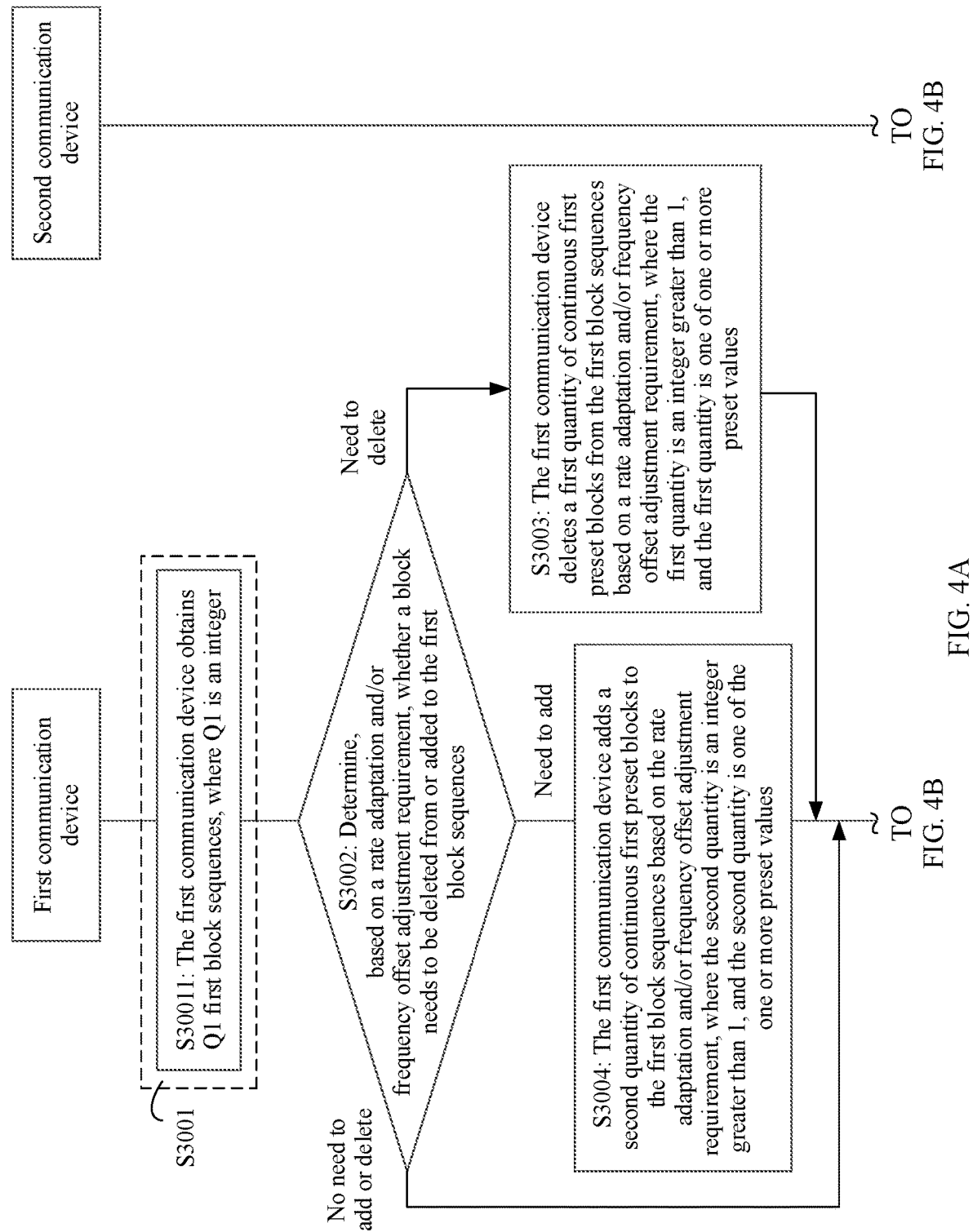

As shown in FIG. 4A, step S3001 in FIG. 3A may include the following step.

Step S30011: The first communication device obtains Q1 first block sequences. Q1 is an integer.

Step S3005 in FIG. 3B may include the following step.

Step S30051: The first communication device multiplexes the obtained Q1 first block sequences to generate a second block sequence.

In a possible implementation, the first communication device may be a source end. In this case, the first communication device may obtain Q1 first bit streams corresponding to Q1 clients, where the Q1 clients are in a one-to-one correspondence with the Q1 first bit streams. The Q1 first bit streams are coded and multiplexed to generate the second block sequence.

In another possible implementation, the first communication device may be an intermediate node. In this case, the first communication device may demultiplex received data from a previous hop, to obtain each of the first block sequences.

Step S30052: The first communication device transmits the second block sequence.

As shown in FIG. 4B, step S3006 in FIG. 3B may include the following steps.

Step S30061: Obtain the second block sequence.

Step S30062: Demultiplex the second block sequence to obtain the Q1 first block sequences, where Q1 is a positive integer.

In the method shown in FIG. 4A and FIG. 4B, the Q1 first block sequences may be block sequences corresponding to a client (for example, a FlexE client). A service of the client may also be referred to as a coarse granularity service. Alternatively, one first block sequence in the Q1 first block sequences may be obtained by multiplexing a plurality of fine granularity services.

Based on FIG. 3A and FIG. 3B and FIG. 4A and FIG. 4B, FIG. 5A and FIG. 5B are a schematic flowchart of an example of another communication method according to an embodiment of this disclosure. In the method, related steps in FIG. 3A and FIG. 3B are extended as follows.

Figure 5A:
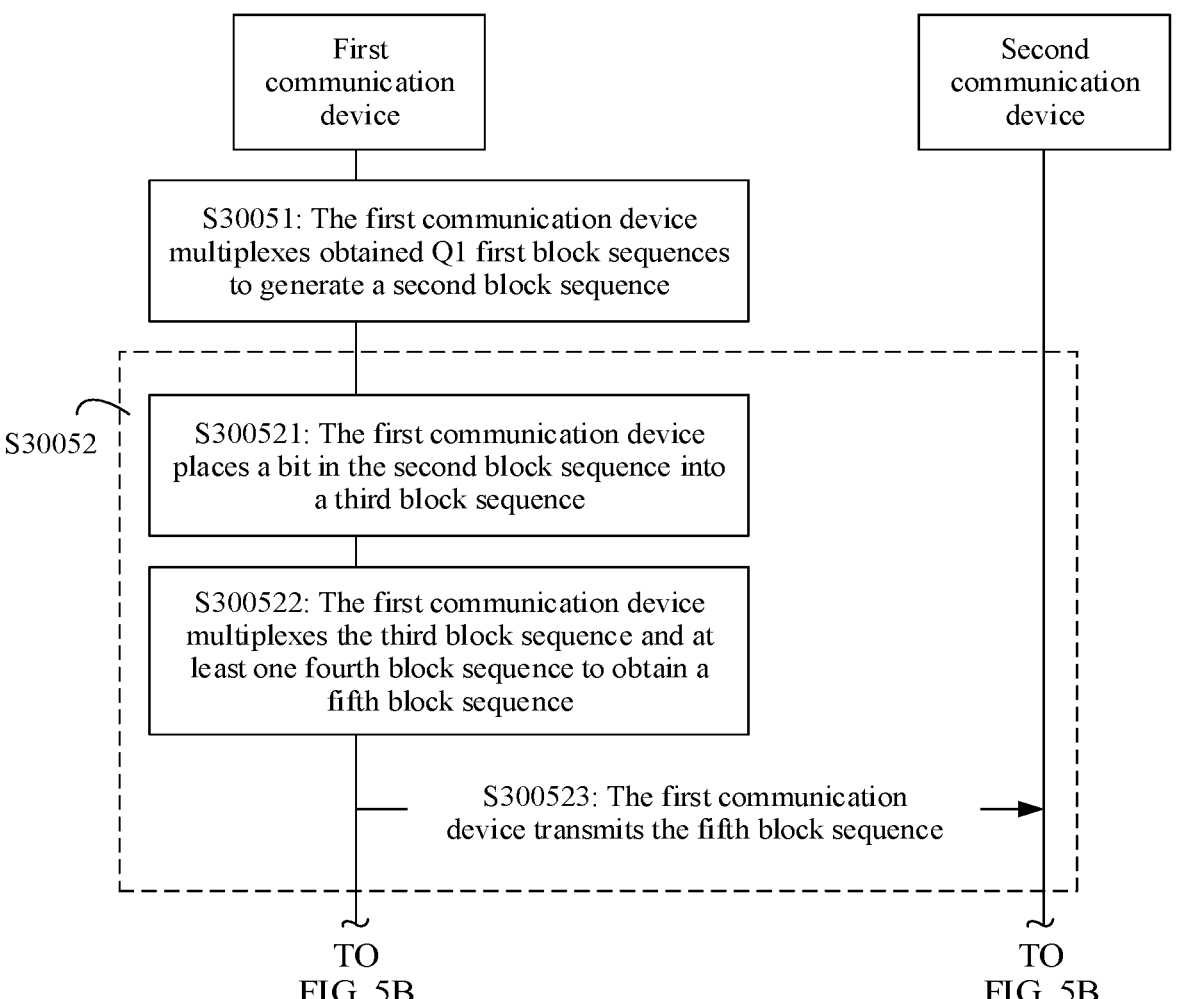
FIG. 5A and FIG. 5B are a schematic flowchart of still another possible communication method according to an embodiment of this disclosure.

As shown in FIG. 5A, step S30052 in FIG. 4B may include the following steps.

S300521: The first communication device generates a third block sequence based on the second block sequence.

S300522: The first communication device multiplexes the third block sequence and at least one fourth block sequence to obtain a fifth block sequence.

S300523: The first communication device transmits the fifth block sequence.

Figure 5B:
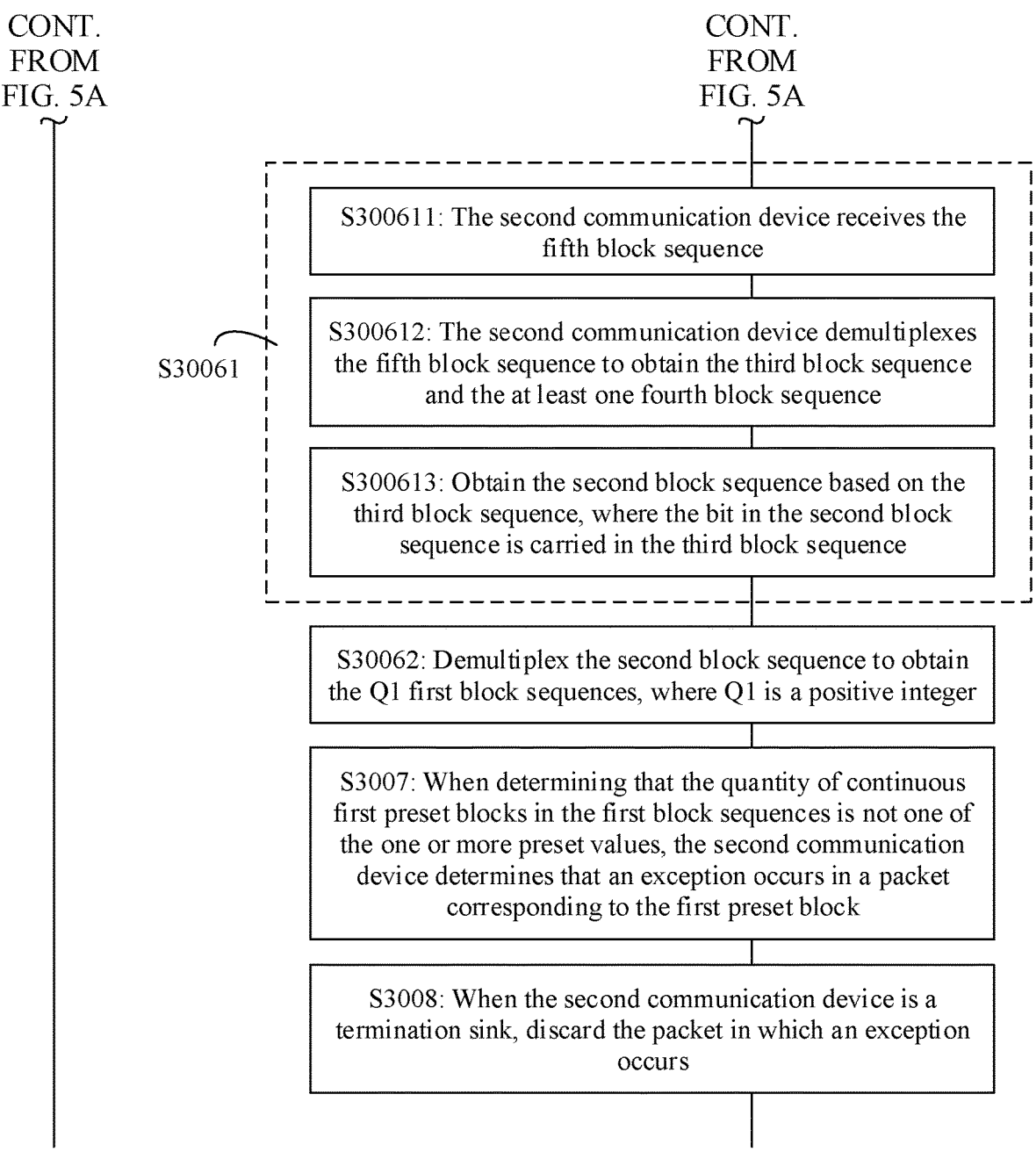

As shown in FIG. 5B, step S30061 in FIG. 4B may include the following steps.

S300611: The second communication device receives the fifth block sequence.

S300612: The second communication device demultiplexes the fifth block sequence to obtain the third block sequence and the at least one fourth block sequence.

S300613: Obtain the second block sequence based on the third block sequence, where a bit in the second block sequence is carried in the third block sequence.

In the method shown in FIG. 5A and FIG. 5B, the Q1 first block sequences may be block sequences corresponding to a fine granularity client. A service of the fine granularity client may also be referred to as a fine granularity service.

For the solution provided in FIG. 5A and FIG. 5B, for example, the second communication device is an intermediate node. After receiving a coarse granularity frame, the second communication device decapsulates the coarse granularity frame in a similar manner, and restores a fine granularity frame fgBU for a coarse granularity slot that carries a fine granularity service. After the fgBU into which a 65-bit idle block sequence is inserted is identified, a sub-slot of the corresponding service is decapsulated based on a requirement, and whether a quantity of idle blocks in a packet is an even number (the preset value) is determined. For example, each fgBU frame includes 24 slots (numbered 0 to 23). According to a slot configuration table, it is learned that $0^{th}$, $1^{st}$, and $7^{th}$ slots belong to a service 1. In this case, when rate adaptation is performed on a service flow of the service 1, data in three sub-slots of the service 1 is gathered in sequence, to determine whether a quantity of idle blocks in a packet is an even number (the preset value).

Alternatively, if the second communication device is a termination sink, and the quantity of idle blocks in the packet is an even number, it is determined that bit flip has not occurred in a first preset block in a data unit. If the quantity is not an even number, it is determined that an error occurs in the data unit, and the second preset block may be inserted into the data unit. Further, the device may forward slot data to an egress port, and when frequency offset adjustment needs to be performed during this process, a 65-bit block sequence inserted into a packet is not changed, and only a 65-bit block in an interpacket gap is processed. For example, an idle block is added or deleted based on a value of a frequency offset. Alternatively, a quantity of first preset blocks added or deleted between packets is the preset value.

Figure 5C:
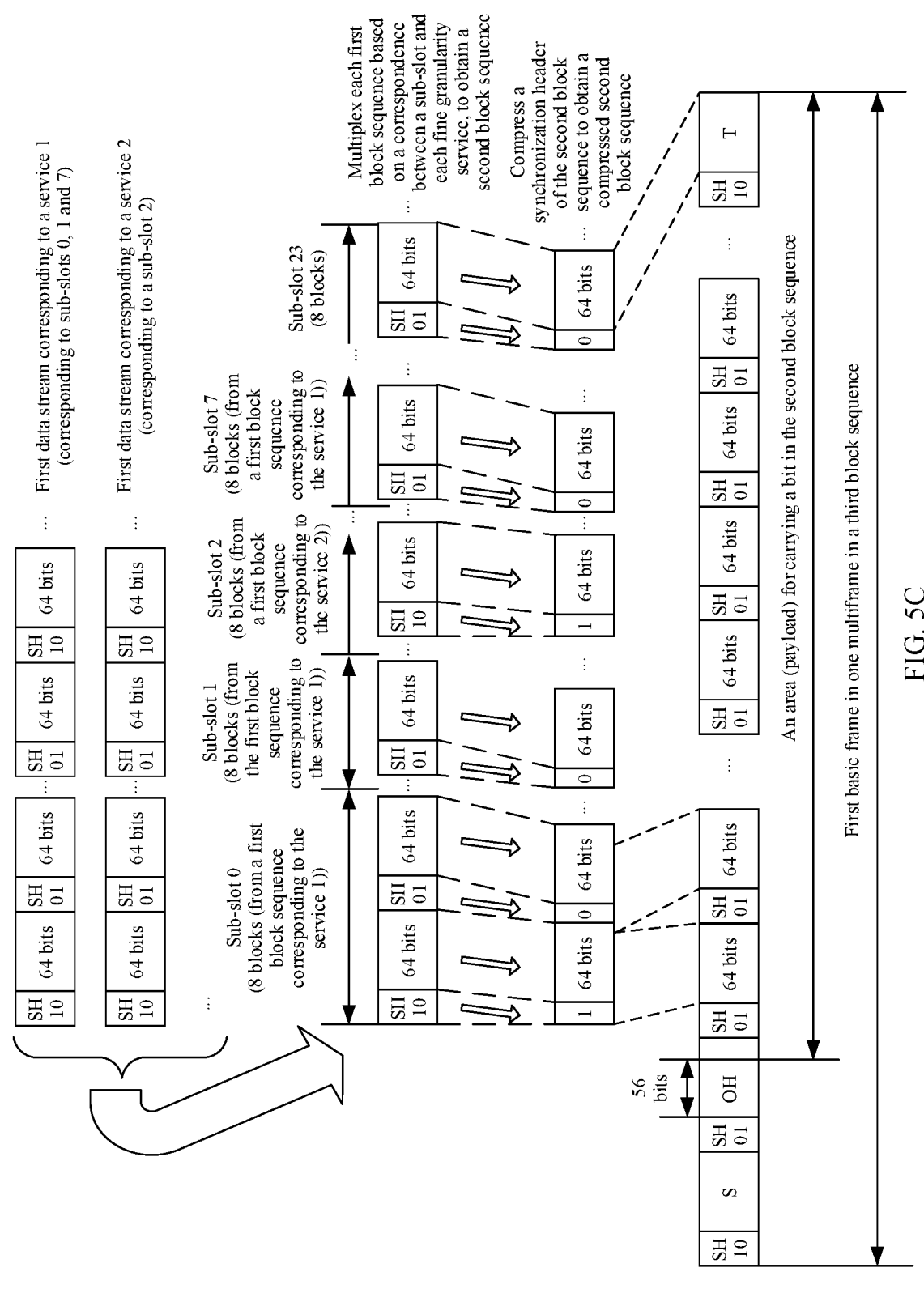
FIG. 5C is a schematic diagram of a manner of generating a third block sequence according to an embodiment of this disclosure.

Based on the solution provided in FIG. 5A and FIG. 5B, FIG. 5C is a schematic diagram of an example of a manner of generating the third block sequence. As shown in FIG. 5C, sub-slots corresponding to the service 1 are a sub-slot 0 and a sub-slot 1. For example, a bandwidth for the service 1 is increased, and a sub-slot 7 is further allocated to the service 1. A sub-slot allocated to a service 2 is a sub-slot 2. One client in the Q1 clients may correspond to one or more sub-slots in 480 sub-slots included in one coarse granularity channel. There may further be one or more sub-slots in the 480 sub-slots that are not allocated to a client.

The Q1 first block sequences are multiplexed based on a correspondence between a sub-slot and each client, to obtain the second block sequence.

A coding type of the second block sequence is M1/N1 bit coding. M1 is a positive integer, and N1 is an integer not less than M1. A coding type of the third block sequence is M2/N2 bit coding. M2 is a positive integer, and N2 is an integer not less than M2. One block in the second block sequence includes a synchronization header of (N1-M1) bits and a non-synchronization header of M1 bits, and information carried in a non-synchronization header of one block in the third block sequence includes at least the non-synchronization header of one block in the second block sequence. The third block sequence further includes indication information used to indicate information carried in the synchronization header of the block in the second block sequence.

For example, a block in the first block sequence is a 64-bit/66-bit block, and a block in the second block sequence is also a 64-bit/66-bit block. Further, the synchronization header of the block in the second block sequence is compressed, and a synchronization header that occupies two bits is compressed into a synchronization header that occupies one bit. For example, if the synchronization header is 01, the synchronization header is 0 after compression, or if the synchronization header is 10, the synchronization header is 1 after compression. One block in the second block sequence after compression is of 64-bit/65-bit coding. Further, the third block sequence is generated based on the second block sequence. For example, the bit in the second block sequence may be placed in a payload in the third block sequence. In other words, the bit in the second block sequence may be encapsulated into an fgBU frame.

With reference to the content shown in FIG. 2F, the second block sequence may be equivalent to the block sequence 411 output from the coarse granularity channel 40, where one multiframe includes 20 basic frames, and one basic frame (that may also be referred to as an fgBU frame) carries data corresponding to 24 sub-slots. A format of one fgBU frame may include the following four parts.

An fgBU preamble: an fgBU delimiter, compatible with an Ethernet preamble, and compatible with an X-Ethernet/MTN coarse granularity channel and Ethernet rate adaptation.

fgBU overheads (OH): used to carry overheads information.

An fgBU payload: carries service data, and may include a bit that is in a D block after the first S block in the fgBU frame and that is not 56-bit OH information, a payload area in another D block, and may further include a bit (for example, a bit other than a synchronization header in a T7 block), in a T block, that can be used to carry service data.

An fgBU encapsulation termination part (T7): compatible with an Ethernet standard T7 block (of a block type 0xFF), where it is recommended that an idle block is added after the encapsulation termination part.

A fine granularity fgBU of an Ethernet high quality leased line has a fixed length, and 197 64B/66B blocks (of 1,567 bytes before coding) include 7-byte fgBU overheads, a 1,560-byte payload, an 8-byte preamble, a 1-byte early failure detection (EFD), and an 8-byte IPG (at atypical rate, each coded fgBU is followed by an idle block).

There is another manner of generating the third block sequence. For example, indication information may be carried in an area in the third block sequence. The indication information is used to indicate the information, carried in the multiframe, from the synchronization header of the block in the second block sequence. The indication information may indicate to extract a compressed 1-bit synchronization header of each block and place all the headers in a preset area, for example, after OH information. Then, only 64 bits, other than the synchronization header, of each block in the second block sequence are sequentially placed in the payload in the third block sequence. The receive end may restore the synchronization header of the block in the second block sequence based on the indication information.

Figure 5D:
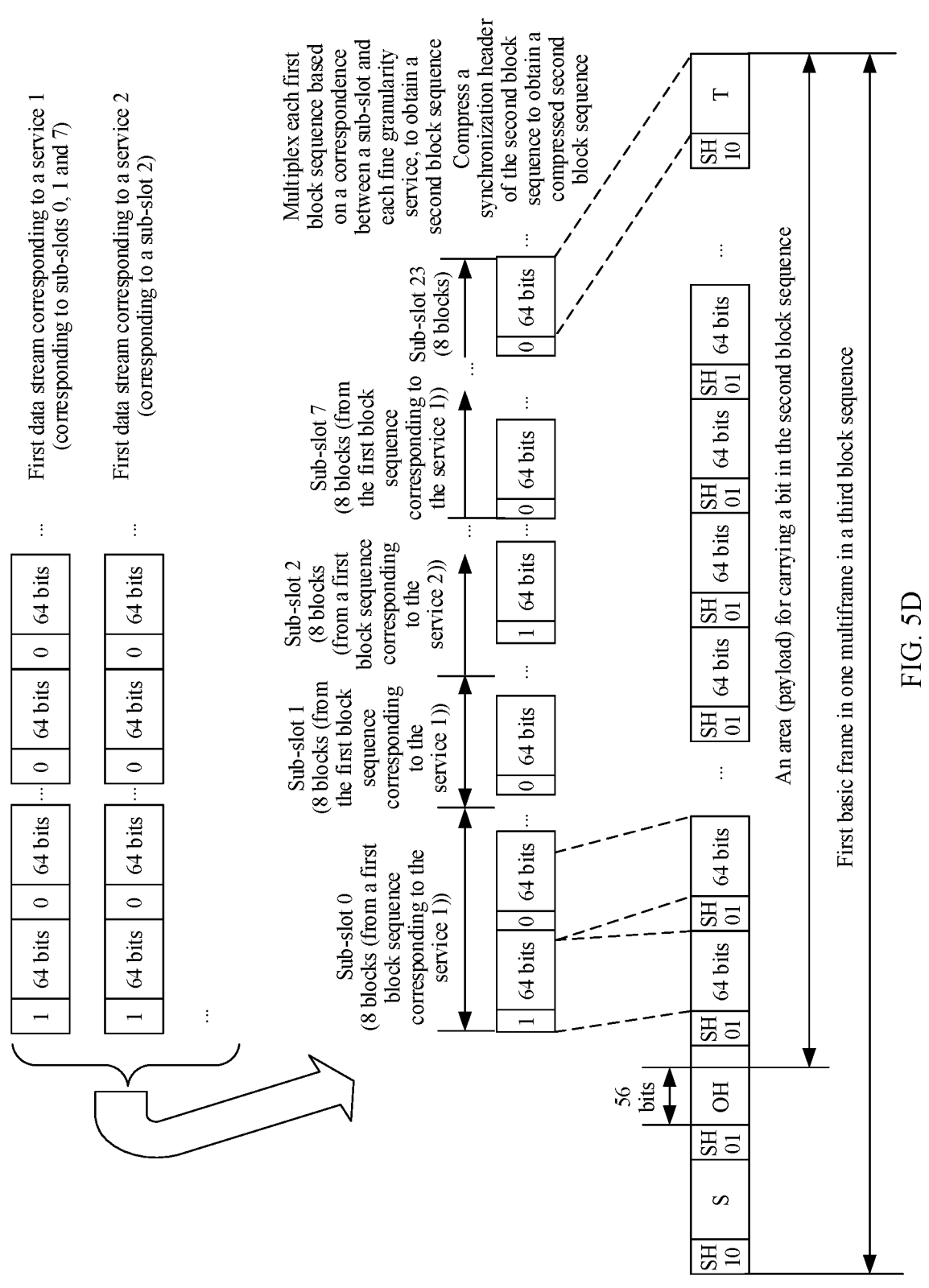
FIG. 5D is a schematic diagram of another manner of generating a third block sequence according to an embodiment of this disclosure.

Based on the solution provided in FIG. 5A and FIG. 5B, FIG. 5D is a schematic diagram of an example of a possible manner of generating the third block sequence. As shown in FIG. 5D, different from that in FIG. 5C, an obtained first block sequence is a 64-bit/65-bit block. In this case, the first block sequence is multiplexed, and directly, a block in an obtained second block sequence is a 64-bit/65-bit block. Therefore, the second block sequence does not need to be compressed in the solution shown in FIG. 5D. Other descriptions are similar to those in FIG. 5C. Details are not described herein again.

It should be noted that there is a plurality of manners of obtaining the first block sequence in FIG. 5D. For example, in a possible implementation, the first communication device receives the third block sequence from a previous hop, restores the second block sequence of 64-bit/65-bit coding from the third block sequence, and demultiplexes the second block sequence to obtain each 64-bit/65-bit first block sequence. Further, after a forwarding relationship is obtained, a corresponding fgBU is encapsulated and distributed in a slot in a cycle on a transmit side. Each sub-slot carries eight 65-bit blocks, and the eight blocks may be used as one code group that may be referred to as CBG8 for short. When a fine granularity is exchanged through each node, an operation may be performed on a 65-bit block.

In another possible implementation, the first communication device may serve as a source end, that is, a node that initially obtains service data, but not an intermediate node. In this case, the first communication device may code a bit stream corresponding to each service, and may directly code the bit stream in a manner of 64-bit/65-bit coding, so that a block in the obtained first block sequence is a 64-bit/65-bit block.

It should be noted that, in this embodiment of this disclosure, a first preset block in the first block sequence is added or deleted, and a coding form of the first preset block may be 64 bits/66 bits (as shown in FIG. 5C) or may be 64 bits/65 bits (as shown in FIG. 5D). In this embodiment of this disclosure, compared with a 64-bit/66-bit block, a synchronization header of a 64-bit/65-bit first preset block is compressed into one bit, where for example, first bits of all synchronization headers are retained.

Based on the foregoing descriptions, one data unit in the first block sequence in this embodiment of this disclosure includes a series of continuous blocks. A coding form of the blocks may be 64 bits/66 bits, or 64 bits/65 bits. In this embodiment of this disclosure, one block may correspond to two coding forms. Compared with a 64-bit/65-bit coding form of one block, in a 64-bit/66-bit coding form, a synchronization header is compressed into one bit, where for example, first bits of all synchronization headers are retained.

When the second communication device inserts the second preset block into one data unit in the first block sequence, a coding form of the second preset block may be 64 bits/66 bits (as shown in FIG. 5C) or may be 64 bits/65 bits (as shown in FIG. 5D). In this embodiment of this disclosure, compared with a 64-bit/66-bit block, a synchronization header of a 64-bit/65-bit second preset block is compressed into one bit, where for example, first bits of all synchronization headers are retained. The second preset block in this embodiment of this disclosure may be a 64-bit/66-bit error block, or may be a 64-bit/65-bit error block.

It can be learned from the content shown in FIG. 5C and FIG. 5D that, when embodiments of this disclosure are applied to a multiplexing process for a fine granularity service, because a block that is finally carried in the third block sequence and that is from the second block sequence is of 64-bit/65-bit coding, where there is a synchronization header of only one bit, during data transmission, flip, that is, from 1 to 0, easily occurs. When a quantity of flipped bits is relatively large, that is, a quantity of error bits exceeds an FCS (cyclic redundancy check (CRC) 24) detection capability, it is very likely to have a problem with MTTFPA. That is, a false packet is accepted as a correct packet. However, in embodiments of this disclosure, a quantity of first preset blocks is used to indicate whether bit flip occurs in a synchronization header, of the first preset block, in the data unit. Therefore, when it is determined that bit flip occurs in a synchronization header of at least one first preset block, the second preset block (for example, an error block) is inserted into the data unit, so that the termination sink discards the packet, thereby reducing a risk of the problem with MTTFPA.

In embodiments of this disclosure, the second communication device may add the second preset block to one data unit in a plurality of manners. In a possible implementation, a manner of inserting the second preset block satisfies the following condition. The data unit fails FCS detection.

Figure 6:
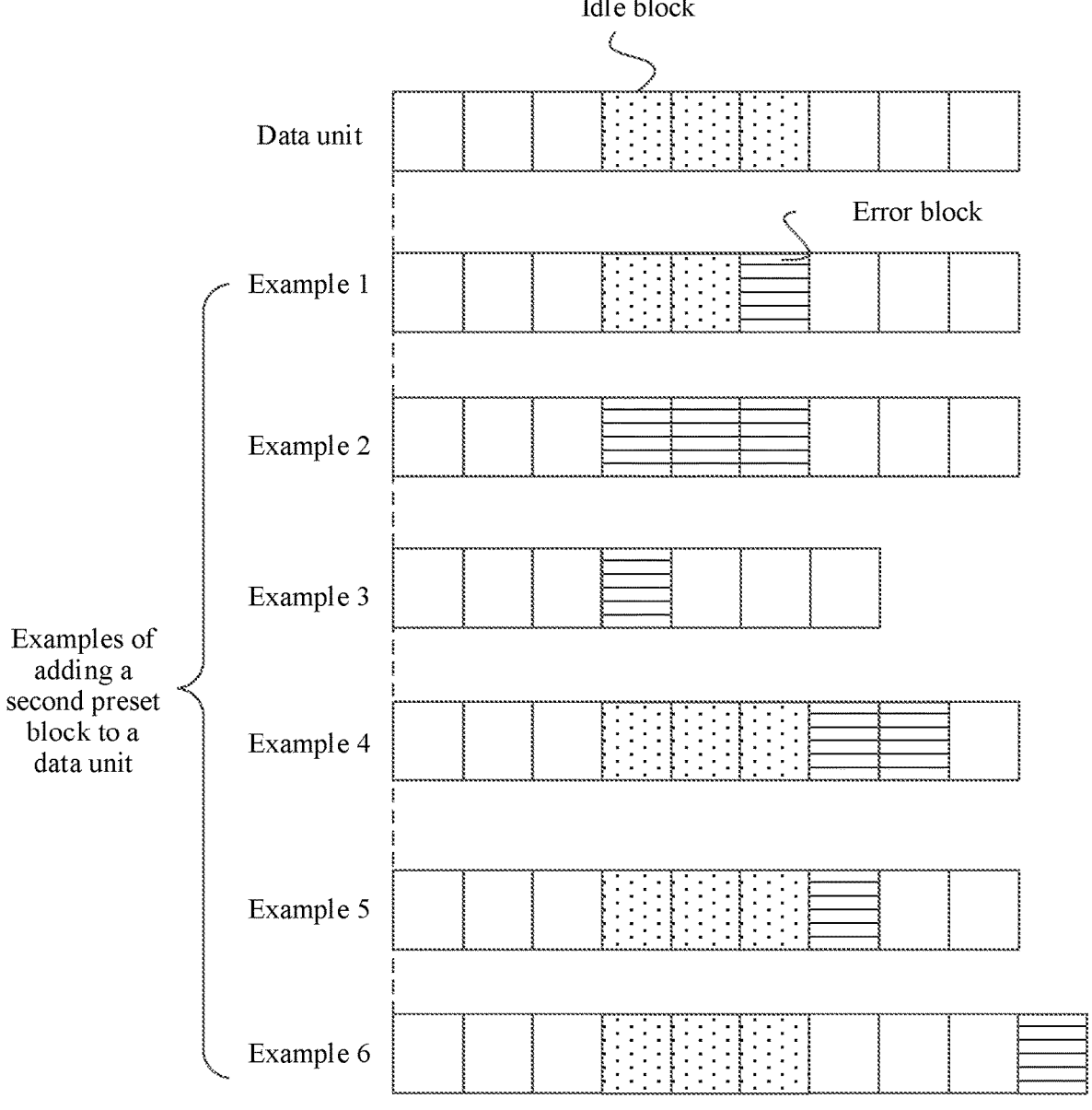
FIG. 6 shows several examples of adding a second preset block to a data unit according to an embodiment of this disclosure.

FIG. 6 shows several possible examples of adding the second preset block to one data unit. In FIG. 6, an example in which the second preset block is an error block of 64-bit/65-bit coding, the first preset block is an IDLE block, and one data unit includes three IDLE blocks is used for presentation. Descriptions are provided below with reference to FIG. 6.

Manner A: At least one first preset block in the data unit is replaced with the second preset block.

Solution A-1: All or a part of first preset blocks in the data unit are replaced with the second preset block.

As shown in Example 1 in FIG. 6, at least one IDLE block is replaced with an error block. As shown in Example 2 in FIG. 6, all IDLE blocks are replaced with error blocks.

Solution A-2: A third quantity of first preset blocks are deleted from the data unit, and a remaining first preset block in the data unit is replaced with the second preset block, where the third quantity is one of the one or more preset values.

As shown in Example 3 in FIG. 6, for example, the preset value is an even number, for example, a group of even numbers, that is, 2, 4, 6, 8, and so on. Because there are three, which is not an even number, IDLE in the data unit, an even-numbered quantity of IDLE blocks may be deleted. That is, two IDLE blocks may be deleted, and one remaining IDLE block is replaced with an error block.

Solution A-3: At least one data block adjacent to the first preset block in the data unit is replaced with the second preset block.

As shown in Example 4 in FIG. 6, two adjacent blocks near an IDLE block are replaced with error blocks.

Solution A-4: A fourth quantity of data blocks adjacent to the first preset block in the data unit are replaced with the second preset block, where a sum of the quantity of first preset blocks in the data unit and the fourth quantity is equal to one of the one or more preset values, and the first preset block and the fourth quantity of second preset blocks after the replacement that are in the data unit are a series of continuous blocks.

As shown in Example 5 in FIG. 6, if an even-numbered quantity of idle blocks that need to be inserted is x blocks, and y blocks of a quantity that is not an even number are received on a receive side, (|x−y|) blocks near the y blocks are replaced with error blocks.

For example, the preset value is 4, and only three IDLE blocks are received. In this case, (4-3) IDLE block near the three IDLE blocks is replaced with an error block.

Solution B: At least one second preset block is added to the data unit.

As shown in Example 6 in FIG. 6, one error block may be added to the end of the data unit. For example, when a data unit includes a T block, an error block may be added after T. If a data unit does not include a T block, the end of a packet is determined in some manners, and an error block is added after the end.

The terms "system" and "network" may be used interchangeably in embodiments of this disclosure. "at least one" means one or more, and "plurality of" means two or more. "and/or" describes an association relationship between associated objects, and indicates that three relationships may exist. For example, A and/or B may indicate the following three cases: only A exists, both A and B exist, and only B exists, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one item (piece) of a, b, or c may indicate: a, b, or c, a and b, a and c, b and c, or a, b, and c, where a, b, or c may be singular or plural.

In addition, unless otherwise stated, ordinal numbers such as "first" and "second" used in embodiments of this disclosure are used to distinguish between a plurality of objects, but are not used to limit an order, a time sequence, priorities, or importance of the plurality of objects. For example, a first request message and a second request message are merely used to distinguish between different request messages, but do not indicate that the two request messages are of different priorities, importance, or the like.

It should be noted that, names of the foregoing messages are merely examples. With evolution of communication technologies, a name of any foregoing message may change. However, regardless of how the name of the message change, provided that a meaning of the message is the same as a meaning of the message in this disclosure, the name shall fall within the protection scope of this disclosure.

The solutions provided in this disclosure are described above mainly from the perspective of interaction between network elements. It can be understood that, to implement the foregoing functions, the network elements each include a corresponding hardware structure and/or a software module for performing the functions. A person skilled in the art should be easily aware that units, algorithms, and steps in the examples described with reference to the embodiments disclosed in this specification can be implemented in a form of hardware or a combination of hardware and computer software in the present disclosure. Whether a function is performed by hardware or hardware driven by computer software depends on a particular application and a design constraint condition of the technical solutions. A person skilled in the art may use different methods to implement the described functions for each particular application, but it should not be considered that the implementation goes beyond the scope of the present disclosure.

Figure 7:
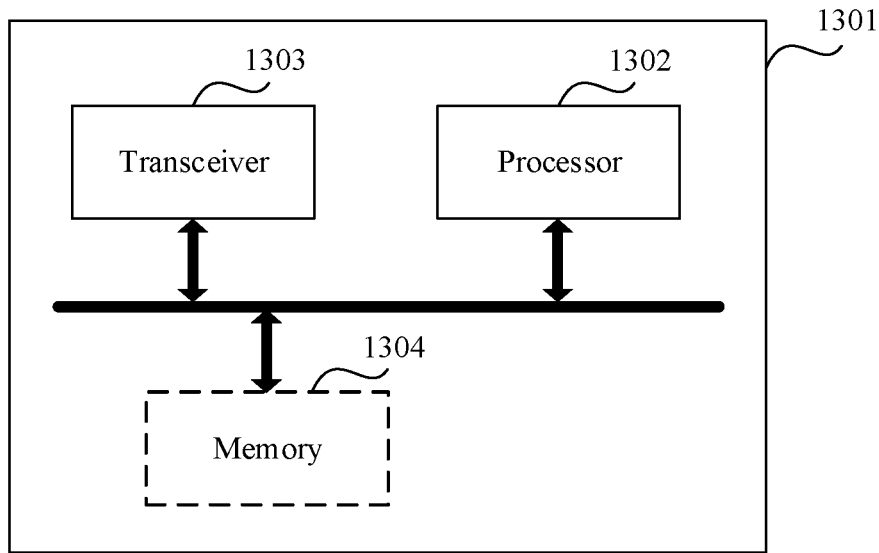
FIG. 7 is a schematic diagram of a structure of a communication apparatus according to an embodiment of this disclosure.

According to the foregoing method, FIG. 7 is a schematic diagram of a structure of a communication apparatus according to an embodiment of this disclosure. As shown in FIG. 7, the communication apparatus may be a first communication device or a second communication device. The communication device may be a network device, or may be a chip or a circuit, for example, a chip or a circuit that can be disposed in a network device.

The communication apparatus 1301 includes a processor 1302 and a transceiver 1303.

Further, the communication apparatus 1301 may include a memory 1304. In the figure, the memory 1304 is represented by using dashed lines, and it further indicates that the memory is optional.

Further, the communication apparatus 1301 may further include a bus system. The processor 1302, the memory 1304, and the transceiver 1303 may be connected through the bus system.

It should be understood that the processor 1302 may be a chip. For example, the processor 1302 may be a field-programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

During implementation, the steps in the foregoing method may be implemented by using a hardware integrated logic circuit in the processor 1302 or an instruction in a form of software. The steps in the method disclosed with reference to embodiments of this disclosure may be directly embodied as being performed and completed by a hardware processor, or performed and completed by a combination of hardware and software modules in the processor 1302. The software module may be located in a mature storage medium in the art, for example, a random-access memory (RAM), a flash memory, a read-only memory (ROM), a programmable ROM (PROM), an electrically erasable PROM (EEPROM), or a register. The storage medium is located in the memory 1304, and the processor 1302 reads information in the memory 1304 and completes the steps in the foregoing method in combination with hardware of the processor.

It should be noted that, the processor 1302 in this embodiment of this disclosure may be an integrated circuit chip that is capable of processing a signal. During implementation, the steps in the foregoing method embodiments may be implemented by using a hardware integrated logic circuit in the processor or an instruction in a form of software. The processor may be a general-purpose processor, a DSP, an ASIC, an FPGA or another programmable logic device, a discrete gate or a transistor logic device, or a discrete hardware component. The processor may implement or perform the method, steps, and logic block diagrams disclosed in embodiments of this disclosure. The general-purpose processor may be a microprocessor, or the processor may be any conventional processor or the like. The steps in the method disclosed with reference to embodiments of this disclosure may be directly embodied as being performed and completed by a hardware decoding processor, or performed and completed by a combination of hardware and software modules in a decoding processor. The software module may be located in a mature storage medium in the art, for example, a RAM, a flash memory, a ROM, a PROM, an EEPROM, or a register. The storage medium is located in the memory, and the processor reads information in the memory and completes the steps in the foregoing method in combination with hardware of the processor.

It can be understood that the memory 1304 in this embodiment of this disclosure may be a volatile memory or a non-volatile memory, or may include both a volatile memory and a non-volatile memory. The non-volatile memory may be a ROM, a PROM, an erasable PROM (EPROM), an EEPROM, or a flash memory. The volatile memory may be a RAM and is used as an external cache. Through examples but not limitative descriptions, RAMs in many forms are available, such as a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus RAM (DRRAM). It should be noted that the memory in the system and method described in this specification is intended to include, but is not limited to, these and any memory of another appropriate type.

When the communication apparatus 1301 corresponds to the first communication device in the foregoing method, the processor 1302 may be configured to perform the following steps: obtaining a first block sequence, deleting a first quantity of continuous first preset blocks from the first block sequence based on a rate adaptation and/or frequency offset adjustment requirement when a block needs to be deleted from the first block sequence, where the first quantity is an integer greater than 1, and the first quantity is one of one or more preset values, adding a second quantity of continuous first preset blocks to the first block sequence based on the rate adaptation and/or frequency offset adjustment requirement when a block needs to be added to the first block sequence, where the second quantity is an integer greater than 1, and the second quantity is one of the one or more preset values, and transmitting the first block sequence by using the transceiver 1303.

When the communication apparatus 1301 corresponds to the second communication device in the foregoing method, the processor 1302 may be configured to perform the following steps: obtaining the first block sequence by using the transceiver 1303, and when the quantity of continuous first preset blocks included in the first block sequence is not one of the one or more preset values, determining that an exception occurs in a packet corresponding to the first preset blocks during transmission.

When the communication apparatus 1301 corresponds to the second communication device in the foregoing method, in a possible implementation, the processor 1302 is further configured to discard a packet corresponding to a data unit.

For concepts, explanations, detailed descriptions, and other steps related to the communication apparatus and the technical solutions provided in embodiments of this disclosure, refer to the descriptions of the content in the foregoing methods or other embodiments. Details are not described herein again.

Figure 8:
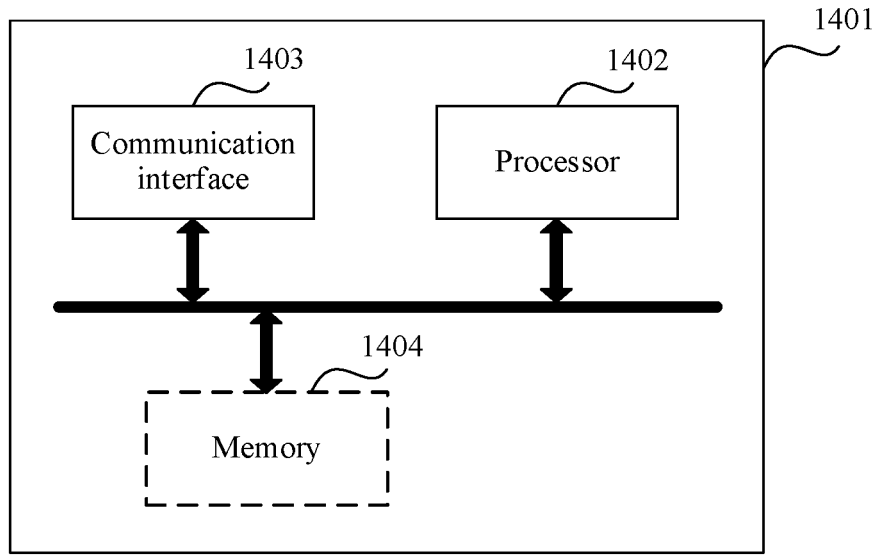
FIG. 8 is a schematic diagram of a structure of a communication apparatus according to an embodiment of this disclosure.

According to the foregoing method, FIG. 8 is a schematic diagram of a structure of a communication apparatus according to an embodiment of this disclosure. As shown in FIG. 8, the communication apparatus 1401 may include a communication interface 1403 and a processor 1402. Further, the communication apparatus 1401 may include a memory 1404. In the figure, the memory 1404 is represented by using dashed lines, and it further indicates that the memory is optional. The communication interface 1403 is configured to input and/or output information. The processor 1402 is configured to execute a computer program or an instruction, so that the communication apparatus 1401 implements the method on the first communication device side in the related solutions in FIG. 1A to FIG. 6, or the communication apparatus 1401 implements the method on the second communication device side in the related solutions in FIG. 1A to FIG. 6. In this embodiment of this disclosure, the communication interface 1403 may implement the solution implemented by the transceiver 1303 in FIG. 7, the processor 1402 may implement the solution implemented by the processor 1302 in FIG. 7, and the memory 1404 may implement the solution implemented by the memory 1304 in FIG. 7. Details are not described herein again.

Figure 9:
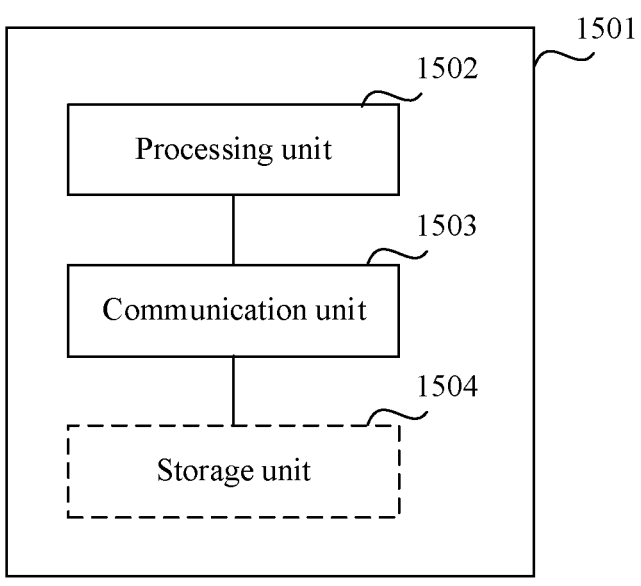
FIG. 9 is a schematic diagram of a communication apparatus according to an embodiment of this disclosure.

Based on the foregoing embodiments and a same concept, FIG. 9 is a schematic diagram of a communication apparatus according to an embodiment of this disclosure. As shown in FIG. 9, the communication apparatus 1501 may be a first communication device or a second communication device, or may be a chip or a circuit, for example, a chip or a circuit that may be disposed in the first communication device or the second communication device.

The communication apparatus 1501 includes a processing unit 1502 and a communication unit 1503. Further, the communication apparatus 1501 may include a storage unit 1504, or may not include a storage unit 1504. In the figure, the storage unit 1504 is represented by using dashed lines, and it further indicates that the storage unit is optional.

The communication apparatus may correspond to the first communication device in the foregoing methods. The processing unit 1502 is configured to obtain a first block sequence, delete a first quantity of continuous first preset blocks from a first block sequence based on a rate adaptation and/or frequency offset adjustment requirement when a block needs to be deleted from the first block sequence, where a second quantity is an integer greater than 1, and the first quantity is one of one or more preset values, add a second quantity of continuous first preset blocks to the first block sequence based on the rate adaptation and/or frequency offset adjustment requirement when a block needs to be added to the first block sequence, where the second quantity is an integer greater than 1, and the second quantity is one of the one or more preset values, and transmit the first block sequence.

The communication apparatus may correspond to the second communication device in the foregoing methods. The processing unit 1502 is configured to obtain the first block sequence, and when the quantity of continuous first preset blocks included in the first block sequence is not one of the one or more preset values, determine that an exception occurs in a packet corresponding to the first preset blocks during transmission.

The processing unit 1502 may be a processor or a controller, for example, may be a general-purpose CPU, a general-purpose processor, a DSP, an ASIC, an FPGA or another programmable logic device, a transistor logic device, a hardware component, or any combination thereof. The processor may implement or execute various examples of logic blocks, modules, and circuits described with reference to content disclosed in this disclosure. Alternatively, the processor may be a combination of processors implementing a computing function, for example, a combination of one or more microprocessors, or a combination of a DSP and a microprocessor. The storage unit 1504 may be a memory. The communication unit 1503 is an interface circuit of the apparatus, and is configured to receive a signal from another apparatus. For example, when the apparatus is implemented as the chip, the communication unit 1503 is an interface circuit of the chip for receiving a signal from another chip or apparatus, or is an interface circuit of the chip for transmitting a signal to another chip or apparatus.

The communication apparatus 1501 may be the first communication device or the second communication device according to any one of the foregoing embodiments. For example, when the communication apparatus 1501 is the first communication device or the second communication device, the processing unit 1502 may be, for example, a processor, and the communication unit 1503 may be, for example, a transceiver. Optionally, the transceiver may include a radio frequency circuit, and the storage unit may be, for example, a memory. For example, when the communication apparatus 1501 is a chip configured to perform cell search, the processing unit 1502 may be, for example, a processor, and the communication unit 1503 may be, for example, an input/output interface, a pin, or a circuit. The processing unit 1502 may execute a computer-executable instruction stored in the storage unit. Optionally, the storage unit is a storage unit in the chip, for example, a register or a cache. Alternatively, the storage unit may be a storage unit that is in a session management network element and that is located outside the chip, for example, a ROM or another type of static storage device that can store static information and a static instruction, or a RAM.

For concepts, explanations, detailed descriptions, and other steps related to the communication apparatus and the technical solutions provided in embodiments of this disclosure, refer to the descriptions of the content in the foregoing methods or other embodiments. Details are not described herein again.

It can be understood that for functions of the units in the communication apparatus 1501, refer to implementations of a corresponding method embodiment. Details are not described herein again.

It should be understood that division into the units in the communication apparatus is merely logical function division. In actual implementation, all or some of the units may be integrated into one physical entity, or may be physically separated. In this embodiment of this disclosure, the communication unit 1503 may be implemented by the transceiver 1303 in FIG. 7, and the processing unit 1502 may be implemented by the processor 1302 in FIG. 7.

According to the methods provided in embodiments of this disclosure, this disclosure further provides a computer program product. The computer program product includes computer program code or an instruction. When the computer program code or the instruction is run on a computer, the computer is enabled to perform the method according to any one of the embodiments shown in FIG. 1A to FIG. 6.

According to the methods provided in embodiments of this disclosure, this disclosure further provides a computer-readable storage medium. The computer-readable medium stores program code, and when the program code is run on a computer, the computer is enabled to perform the method according to any one of the embodiments shown in FIG. 1A to FIG. 6.

According to the methods provided in embodiments of this disclosure, this disclosure further provides a chip system. The chip system may include a processor. The processor is coupled to a memory, and may be configured to perform the method according to any one of the embodiments shown in FIG. 1A to FIG. 6. Optionally, the chip system further includes the memory. The memory is configured to store a computer program (that may also be referred to as code or an instruction). The processor is configured to invoke, from the memory, and run the computer program, so that a device on which the chip system is installed performs the method according to any one of the embodiments shown in FIG. 1A to FIG. 6.

According to the methods provided in embodiments of this disclosure, this disclosure further provides a system, including one or more first communication devices and one or more second communication devices described above.

All or some of the foregoing embodiments may be implemented by using software, hardware, firmware, or any combination thereof. When software is used for implementation, all or some of embodiments may be implemented in a form of a computer program product. The computer program product includes one or more computer instructions. When the computer instruction is loaded and executed on a computer, the procedures or functions according to embodiments of this disclosure are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, using a coaxial cable, an optical fiber, or a digital subscriber line (DSL)) or wireless (for example, via infrared, radio, or microwaves) manner. The computer-readable storage medium may be any usable medium accessible by computer, or a data storage device, for example, a server or a data center, integrating one or more usable media. The usable medium may be a magnetic medium (for example, a floppy disk, a hard disk, or a magnetic tape), an optical medium (for example, a high-density DIGITAL VERSATILE DISC (DVD)), a semiconductor medium (for example, a solid-state drive (SSD)), or the like.

It should be noted that a part of this patent application document includes copyright-protected content. The copyright owner reserves the copyright except cases in which copies are made by using patent files or documented content of the patent files in the patent office.

The first communication device and the second communication device in the foregoing apparatus embodiments correspond to the second communication device or the first communication device in the method embodiments. A corresponding module or unit performs a corresponding step. For example, a communication unit (a transceiver) performs a step of receiving or transmitting in the method embodiments, and a step other than the step of transmitting and receiving may be performed by a processing unit (a processor). For a function of a specific unit, refer to a corresponding method embodiment. There may be one or more processors.

The terms such as "component", "module", and "system" used in this specification are used to represent computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or an execution thread, and the component may be included in one computer and/or distributed over two or more computers. In addition, the component may be executed from various computer-readable media that store various data structures. For example, the component may perform communication through a local and/or remote process based on, for example, a signal that has one or more data packets (for example, data from two components interacting with another component in a local system, a distributed system, and/or across a network, for example, the Internet interacting with another system by using the signal).

A person of ordinary skill in the art may be aware that, with reference to the examples described in embodiments disclosed in this specification, illustrative logical block and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It can be clearly understood by a person skilled in the art that, for convenient and brief description, for a detailed working process of the foregoing system, apparatus, and unit, refer to a corresponding process in the foregoing method embodiments. Details are not described herein again.

In several embodiments provided in this disclosure, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual coupling, direct coupling, or communication connection may be implemented through some interfaces. The indirect coupling or the communication connection between the apparatuses or units may be implemented in electronic, mechanical, or another form.

The units described as separate parts may or may not be physically separate, and parts displayed as units may or may not be physical units, and may have one location, or may be distributed over a plurality of network units. All or some of the units may be selected based on an actual requirement, to achieve the objectives of the solutions of embodiments.

In addition, the functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (that may be a personal computer, a server, or a network device) to perform all or some of the steps in the method described in embodiments of this disclosure. The foregoing storage medium includes any medium that can store program code, for example, a Universal Serial Bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method comprising:
obtaining a first block sequence;
deleting a first quantity of continuous first preset blocks from the first block sequence based on a rate adaptation or a frequency offset adjustment requirement when a first block is to be deleted from the first block sequence to obtain a modified first block sequence, wherein the first quantity is an integer greater than 1 and is one of one or more preset values;
adding a second quantity of continuous first preset blocks to the first block sequence based on the rate adaptation or the frequency offset adjustment requirement when a second block is to be added to the first block sequence to obtain the modified first block sequence, wherein the second quantity is an integer greater than 1 and is one of the one or more preset values;
transmitting the modified first block sequence; and
either:
(1) multiplexing Q1 obtained first block sequences to generate a second block sequence and transmitting the second block sequence, wherein Q1 is a positive integer; or
(2) multiplexing the Q1 obtained first block sequences to generate the second block sequence, generating a third block sequence based on the second block sequence, multiplexing the third block sequence and at least one fourth block sequence to obtain a fifth block sequence, and transmitting the fifth block sequence.

2. The method of claim 1, wherein a third quantity of the first preset blocks in the first block sequence indicates whether an exception occurs in a packet corresponding to the first preset blocks during transmission.

3. The method of claim 1, wherein each of the one or more preset values satisfies one of the following: each of the one or more preset values is an even number.

4. The method of claim 1, wherein the first preset blocks are idle blocks.

5. The method of claim 1, further comprising:
identifying that a third quantity of continuous first preset blocks comprised in the first block sequence is not one of the one or more preset values; and
determining, in response to identifying that the third quantity is not the one of the one or more preset values, that an exception occurs in a packet corresponding to the first preset blocks during transmission.

6. The method of claim 1, wherein a first coding type of the second block sequence is M1/N1 bit coding, wherein M1 is a positive integer, wherein N1 is an integer greater than or equal M1, wherein a second coding type of the third block sequence is M2/N2 bit coding, wherein M2 is a positive integer, wherein N2 is an integer greater than or equal to M2, wherein one block in the second block sequence comprises a synchronization header of (N1-M1) bits and a first non-synchronization header of M1 bits, wherein first information carried in a second non-synchronization header of one block in the third block sequence comprises the first non-synchronization header, and wherein the third block sequence further comprises indication information indicating second information carried in the synchronization header.

7. A method comprising:

obtaining a first block sequence comprising a first quantity of continuous first preset blocks;

determining that a first exception occurs in a first packet corresponding to the first preset blocks during transmission when the first quantity is not one of one or more preset values, wherein the first block sequence further comprises at least one data unit, and wherein the at least one data unit comprises a series of continuous blocks; and inserting at least one second preset block into one data unit in the at least one data unit when the one data unit comprises a first preset block and a second quantity of the first preset blocks comprised in the one data unit is not one of the one or more preset values, and wherein the at least one second preset block indicates that a second exception occurs in a second packet corresponding to the one data unit during the transmission.

8. The method of claim 7, wherein obtaining the first block sequence comprises obtaining a second block sequence and demultiplexing the second block sequence to obtain Q1 first block sequences, wherein Q1 is a positive integer.

9. The method of claim 7, wherein inserting the at least one second preset block comprises one of the following:

replacing at least one first preset block in the one data unit with the at least one second preset block; or adding the at least one second preset block to the one data unit.

10. The method of claim 9, wherein replacing the at least one first preset block with the at least one second preset block comprises at least one of:

replacing all or a part of the first preset blocks in the one data unit with the at least one second preset block;

deleting a third quantity of the first preset blocks from the one data unit and replacing a remaining first preset block in the one data unit with the at least one second preset block, wherein the third quantity is one of the one or more preset values;

replacing at least one data block adjacent to the first preset block with the at least one second preset block; or replacing a fourth quantity of data blocks adjacent to the first preset block with the at least one second preset block, wherein a sum of the second quantity and the fourth quantity is equal to one of the one or more preset values, and wherein the first preset block and the fourth quantity of second preset blocks after replacing the fourth quantity that are in the one data unit are a second series of continuous blocks.

11. The method of claim 7, wherein each of the one or more preset values satisfies a preset calculation formula.

12. The method of claim 7, wherein one of the first preset blocks is a local fault block.

13. The method of claim 7, wherein the at least one second preset block is an error block.

14. The method of claim 7, wherein obtaining the first block sequence comprises receiving a fifth block sequence, demultiplexing the fifth block sequence to obtain a third block sequence and at least one fourth block sequence, obtaining a second block sequence based on the third block sequence, and demultiplexing the second block sequence to obtain Q1 first block sequences, wherein Q1 is a positive integer.

15. The method of claim 14, wherein a first coding type of the second block sequence is M1/N1 bit coding, wherein M1 is a positive integer, wherein N1 is an integer greater than or equal to M1, wherein a second coding type of the third block sequence is M2/N2 bit coding, wherein M2 is a positive integer, wherein N2 is an integer greater than or equal to M2, wherein one block in the second block sequence comprises a synchronization header of (N1-M1) bits and a first non-synchronization header of M1 bits, wherein first information carried in a second non-synchronization header of one block in the third block sequence comprises the first non-synchronization header, and wherein the third block sequence further comprises indication information indicating second information carried in the synchronization header.

16. A device comprising:

a communication interface; and one or more processors coupled to the communication interface and configured to:

obtain a first block sequence;

delete a first quantity of continuous first preset blocks from the first block sequence based on a rate adaptation or a frequency offset adjustment requirement when a block is to be deleted from the first block sequence to obtain a modified first block sequence, wherein the first quantity is an integer greater than 1 and is one of one or more preset values;

add a second quantity of continuous first preset blocks to the first block sequence based on the rate adaptation or the frequency offset adjustment requirement when a block is to be added to the first block sequence to obtain the modified first block sequence, wherein the second quantity is an integer greater than 1 and is one of the one or more preset values;

transmit the modified first block sequence through the communication interface;

identify that a third quantity of continuous first preset blocks comprised in the first block sequence is not one of the one or more preset values; and determine, in response to identifying that the third quantity is not the one of the one or more preset values, that an exception occurs in a packet corresponding to the first preset blocks during transmission.

17. The device of claim 16 wherein each of the one or more preset values satisfies one of the following:

each of the one or more preset values is an even number; or each of the one or more preset values satisfies a preset calculation formula.

18. The device of claim 16, wherein the first preset blocks are one of the following:

low power blocks; or custom blocks.

19. The device of claim 16, wherein the one or more processors are further configured to multiplex Q1 obtained first block sequences to generate a second block sequence and transmit the second block sequence through the communication interface, wherein Q1 is a positive integer.

20. The device of claim 16, wherein the one or more processors are further configured to multiplex Q1 obtained first block sequences to generate a second block sequence, generate a third block sequence based on the second block sequence, multiplex the third block sequence and at least one fourth block sequence to obtain a fifth block sequence, and transmit the fifth block sequence through the communication interface, wherein Q1 is a positive integer.

* * * * *